(12) United States Patent
Kim et al.

(10) Patent No.: US 12,147,070 B2
(45) Date of Patent: Nov. 19, 2024

(54) DISPLAY BACKLIGHT UNIT WITH EDGELIT LIGHT GUIDE HAVING PROTRUDING PATTERN ON BOTTOM SURFACE

(71) Applicant: LG Display Co., Ltd., Seoul (KR)

(72) Inventors: Seongil Kim, Paju-si (KR); Junghyun Kim, Paju-si (KR); Youngmin Oh, Paju-si (KR)

(73) Assignee: LG DISPLAY CO., LTD., Seoul (KR)

(*) Notice: Subject to any disclaimer, the term of this patent is extended or adjusted under 35 U.S.C. 154(b) by 0 days.

(21) Appl. No.: 18/233,648

(22) Filed: Aug. 14, 2023

(65) Prior Publication Data

US 2024/0184032 A1    Jun. 6, 2024

(30) Foreign Application Priority Data

Dec. 5, 2022    (KR) .................... 10-2022-0167635

(51) Int. Cl.
*F21V 8/00*    (2006.01)
(52) U.S. Cl.
CPC ......... *G02B 6/0036* (2013.01); *G02B 6/0058* (2013.01); *G02B 6/0068* (2013.01); *G02B 6/0076* (2013.01)
(58) Field of Classification Search
CPC ............. G02F 1/1336; G02F 1/133615; G02B 6/0035; G02B 6/0036; G02B 6/0058; G02B 6/0068; G02B 6/0075; G02B 6/0076
See application file for complete search history.

(56) References Cited

U.S. PATENT DOCUMENTS

| | | | | |
|---|---|---|---|---|
| 4,811,507 A * | 3/1989 | Blanchet | ............... | G02B 6/0036 362/604 |
| 5,070,431 A * | 12/1991 | Kitazawa | ........... | G02F 1/133615 362/601 |
| 5,584,556 A * | 12/1996 | Yokoyama | ........... | G02B 6/0038 362/330 |
| 5,664,862 A * | 9/1997 | Redmond | ............. | F24C 15/008 362/625 |
| 5,961,198 A * | 10/1999 | Hira | ..................... | G02B 6/0036 362/621 |
| 6,334,690 B1 * | 1/2002 | Ohkawa | ............... | G02B 6/0036 362/333 |
| 7,478,942 B2 * | 1/2009 | Kim | ..................... | G02B 6/0036 362/559 |

(Continued)

FOREIGN PATENT DOCUMENTS

KR    10-2023-0045807 A    4/2023

*Primary Examiner* — Ismael Negron
(74) *Attorney, Agent, or Firm* — Birch, Stewart, Kolasch & Birch, LLP

(57) ABSTRACT

A display includes a display panel; and a backlight unit with a first light source package, a second light source package facing towards the first light source package, and a light guide plate disposed between the first light source package and the second light source package. The light guide plate includes first and second patterns protruding from a bottom surface of the light guide plate, the patterns including at least one inclined surface with respect to the bottom surface of the light guide plate, the inclined surface facing towards a corresponding one of the first light source package or the second light source package.

11 Claims, 17 Drawing Sheets

(56) References Cited

U.S. PATENT DOCUMENTS

| | | | | |
|---|---|---|---|---|
| 8,092,068 B2* | 1/2012 | Parker | ................ | F21V 11/00 |
| | | | | 359/615 |
| 8,702,295 B2* | 4/2014 | Lin | ................ | G02B 6/0083 |
| | | | | 362/616 |
| 8,944,662 B2* | 2/2015 | Thompson | ............ | G02B 6/005 |
| | | | | 362/613 |
| 9,568,660 B2* | 2/2017 | Yang | ................ | G02B 6/0036 |
| 10,012,782 B2* | 7/2018 | Lee | ................ | G02B 6/0073 |
| 10,036,846 B2* | 7/2018 | Lee | ................ | G02B 6/0055 |
| 10,234,618 B2* | 3/2019 | Choi | ................ | G02B 6/0068 |
| 10,416,370 B2* | 9/2019 | Diana | ................ | G02B 6/0043 |
| 10,605,974 B2* | 3/2020 | Wang | ................ | G02B 6/0036 |
| 2004/0196645 A1* | 10/2004 | Allinson | ............ | G02B 6/0036 |
| | | | | 362/613 |
| 2008/0112187 A1* | 5/2008 | Katsumata | ........... | G02B 6/0076 |
| | | | | 362/611 |
| 2011/0141395 A1* | 6/2011 | Yashiro | ............... | G02B 6/0038 |
| | | | | 362/606 |
| 2014/0098563 A1* | 4/2014 | Kim | ................ | G02B 6/0076 |
| | | | | 362/613 |
| 2023/0408854 A1* | 12/2023 | Wu | ................ | G02B 6/0023 |

* cited by examiner

FIG. 5
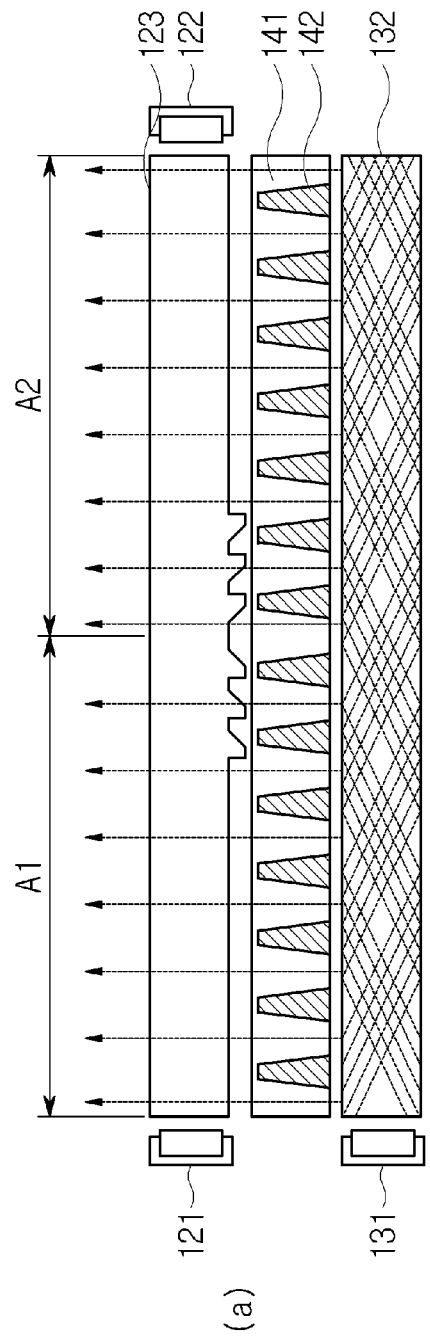
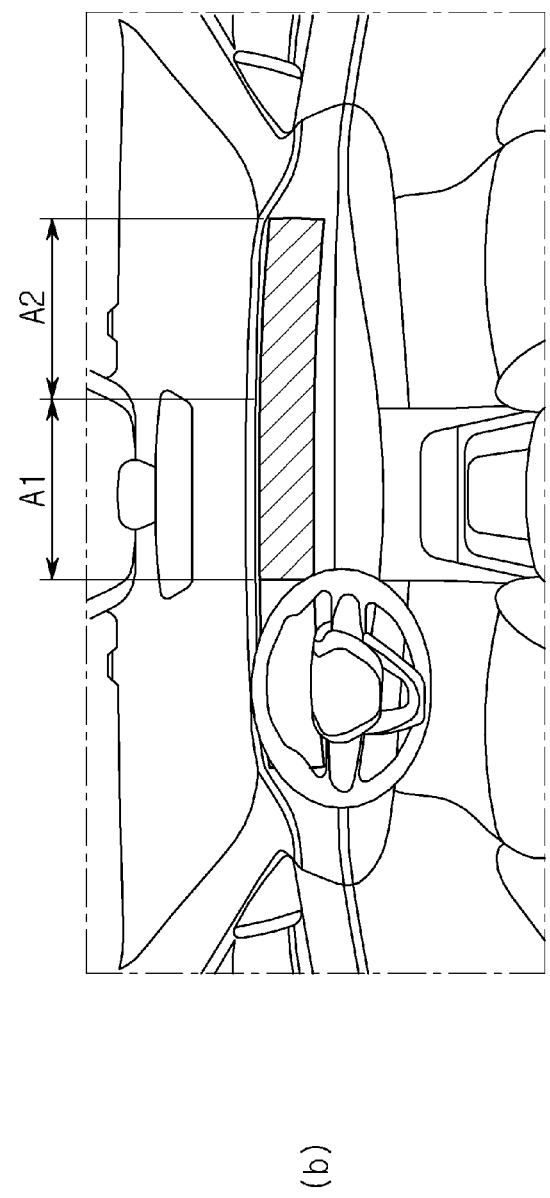

DISPLAY BACKLIGHT UNIT WITH EDGELIT LIGHT GUIDE HAVING PROTRUDING PATTERN ON BOTTOM SURFACE

CROSS REFERENCE TO RELATED APPLICATION

The present application claims priority to Korean Patent Application No. 10-2022-0167635, filed in the Republic of Korea on Dec. 5, 2022, the entirety of which is incorporated by reference for all purposes into the present application.

BACKGROUND

Field of the Invention

The present invention relates to a backlight unit and a display device including the same.

Description of the Related Art

With the development of the information society, various forms of display devices are being developed. Recently, various types of display devices such as liquid crystal display (LCD), plasma display panel (PDP), and organic light emitting display (OLED) are being utilized.

Typical display devices do not restrict the viewing angle. For example, OLEDs and LCDs can have a wide viewing angle, which is often desirable is most situations, but this can be undesirable in some situations. However, due to concerns such as safety, privacy and information security, there has been an increasing demand for display devices that have restricted viewing angles. For instance, when using display devices as information media inside vehicles, it may be desirable to restrict the viewing angle for the driver to ensure safe driving and avoid distractions, while providing high-quality images to passengers sitting in the front passenger seat.

SUMMARY OF THE DISCLOSURE

Embodiments of the present disclosure provide a backlight unit capable of effectively limiting a viewing angle and a display device including the same.

A backlight unit according to an embodiment of the present disclosure can include a first light source package generating light, a second light source package generating light and facing the first light source package, and a light guide plate disposed between the first and second light source packages and including patterns protruded on a bottom surface thereon.

The patterns can face the first light source package or the second light source package and include at least one inclined surface with a predetermined inclination angle with respect to the bottom surface.

The patterns can include first patterns formed in a first area adjacent to the first light source package and including a first inclined surface facing the first light source package and second patterns formed in a second area adjacent to the second light source package and including a second inclined surface facing the second light source package.

The first patterns and the second patterns can have a mirrored shape or to be symmetrically arranged based on a boundary between the first area and the second area.

The first patterns and the second patterns can have a cross-section of an asymmetric trapezoidal shape with the inclined surface as a vertical side.

The light incident from the first light source package to the light guide plate can be refracted by the first inclined surface of the first patterns and emitted through a top surface in the first area, and the light incident from the second light source package to the light guide plate can be refracted by the second inclined surface of the second patterns and emitted through a top surface in the second area.

The first area and the second area can be adjacent to each other, and the first patterns and the second patterns can be arranged adjacent to each other at a boundary between the first area and the second area.

The first area and the second area can be spaced apart from each other, a third area can be formed between the first area and the second area, and the first patterns and the second patterns can be spaced apart from each other.

The backlight unit can further include a third light source package arranged on one side of the third area.

The patterns can be formed in the third area and include third patterns including a third inclined surface facing the first light source package or the second light source package.

The third inclined surface can have an inclination angle that is less than the inclination angle of the first inclined surface and the second inclined surface.

The backlight unit can further include fourth patterns protruded in the form of a dome or a dome shape on a top surface of the light guide plate.

The light guide plate can have a thickness greater at the edges adjacent to the first and second light source packages than the thickness at a center region thereof.

A display device according to an embodiment of the present disclosure includes a display panel including pixels and displaying an image, a first backlight unit arranged beneath the display panel and emitting light to the display panel, a second backlight unit arranged beneath the first backlight unit, and a light path control pattern arranged between the first backlight unit and the second backlight unit and including a light shielding pattern to control the light to be emitted in a narrow angle range.

The first backlight unit can include a first light source package generating light, a second light source package generating light and facing the first light source package, and a first light guide plate disposed between the first and second light source packages and including patterns protruded on a bottom surface thereon.

The patterns can face the first light source package or the second light source package and include at least one inclined surface with a predetermined inclination angle with respect to the bottom surface.

The display device can include a third light source package generating light and a second light guide plate arranged on one side of the third light source package.

The patterns can include first patterns formed in a first area adjacent to the first light source package and including a first inclined surface facing the first light source package and second patterns formed in a second area adjacent to the second light source package and including a second inclined surface facing the second light source package.

The light incident from the first light source package to the first light guide plate can be refracted by the first inclined surface of the first patterns and emitted through a top surface in the first area, the light incident from the second light source package to the first light guide plate can be refracted by the second inclined surface of the second patterns and emitted through a top surface in the second area, and the light incident from the third light source package to the second light guide plate can be emitted through a top surface of the second light guide plate and then emitted within a narrow angle range through the light path control pattern in the first and second areas.

The display device can further include a third area formed between the first area and the second area, and the first backlight unit further include a fourth light source package arranged on one side of the third area.

The light incident from the fourth light source package to the first light guide plate can be emitted through the top surface of the first light guide plate in the third area.

The patterns can include third patterns formed in a third area between the first area and the second area and including a third inclined surface facing the first backlight unit or the second backlight unit.

The third inclined surface can have an inclination angle that is less than the inclination angle of the first inclined surface and the second inclined surface.

BRIEF DESCRIPTION OF THE DRAWINGS

The above and other aspects, features and other advantages of the present disclosure will be more clearly understood from the following detailed description taken in conjunction with the accompanying drawings, in which:

FIGS. 4 to 7 are cross-sectional views illustrating various modes of a display device according to an embodiment of the present disclosure;

DETAILED DESCRIPTION OF THE EMBODIMENTS

Figure 1:
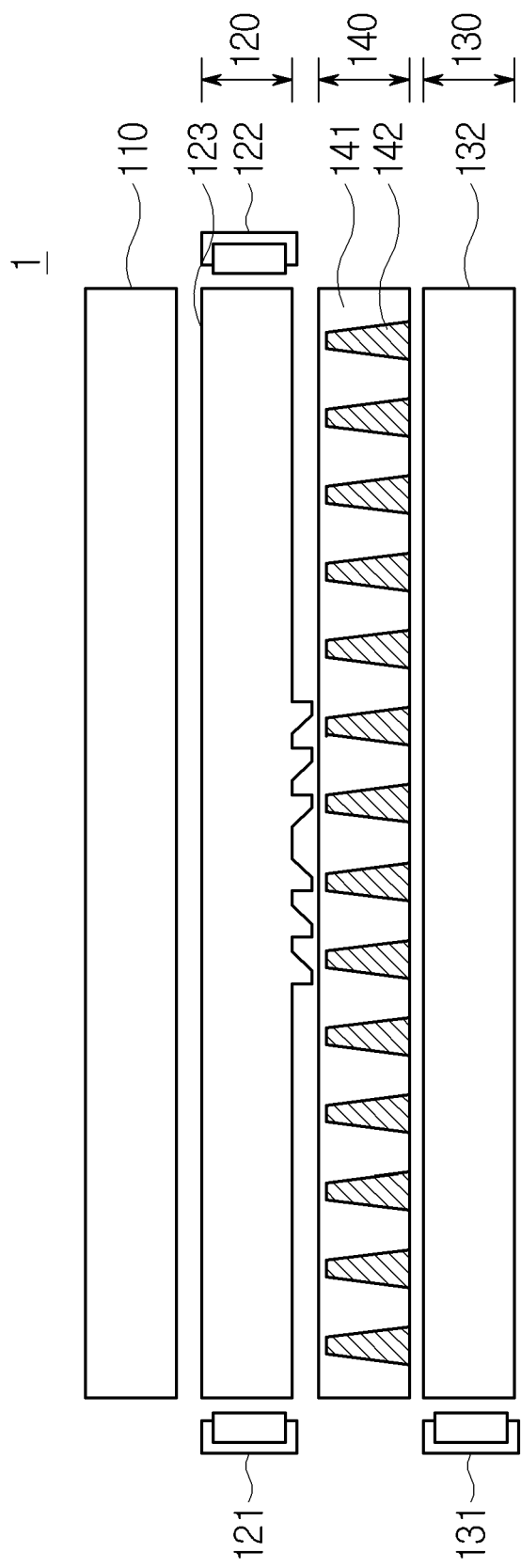
FIG. 1 is a cross-sectional view of a display device according to an embodiment of the present disclosure.

Hereinafter, embodiments will be described with reference to accompanying drawings. In the specification, when a component (or area, layer, part, etc.) is mentioned as being "on top of," "connected to," or "coupled to" another component, it means that it can be directly connected/coupled to the other component, or a third component can be placed between them.

The same reference numerals refer to the same components. In addition, in the drawings, the thickness, proportions, and dimensions of the components are exaggerated for effective description of the technical content. The expression "and/of" is taken to include one or more combinations that can be defined by associated components.

The terms "first," "second," etc. are used to describe various components, but the components should not be limited by these terms. The terms are used only for distinguishing one component from another component. For example, a first component can be referred to as a second component and, similarly, the second component can be referred to as the first component, without departing from the scope of the present invention. As used herein, the singular forms are intended to include the plural forms as well, unless the context clearly indicates otherwise.

The terms such as "below," "lower," "above," "upper," etc. are used to describe the relationship of components depicted in the drawings. The terms are relative concepts and are described based on the direction indicated on the drawing.

It will be further understood that the terms "comprises," "has," and the like are intended to specify the presence of stated features, numbers, steps, operations, components, parts, or a combination thereof but are not intended to preclude the presence or possibility of one or more other features, numbers, steps, operations, components, parts, or combinations thereof.

The features of various embodiments of the present disclosure can be partially or entirely coupled to or combined with each other and can be interlocked and operated in technically various ways, and the embodiments can be carried out independently of or in association with each other.

Figure 2:
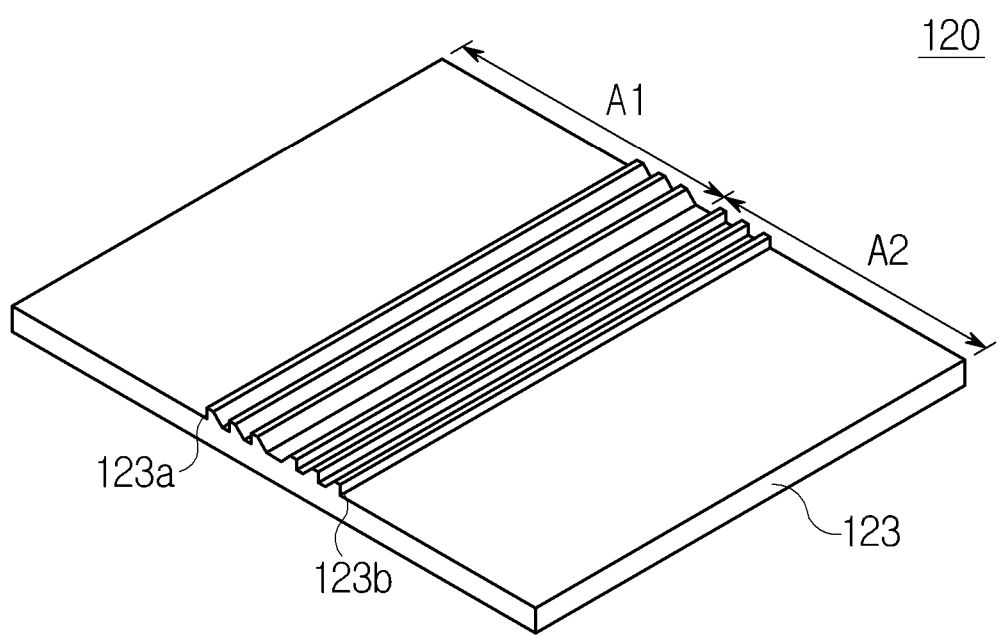
FIG. 2 is a rear perspective view schematically illustrating a structure of a first light guide plate according to an embodiment of the present disclosure.
Figure 3:
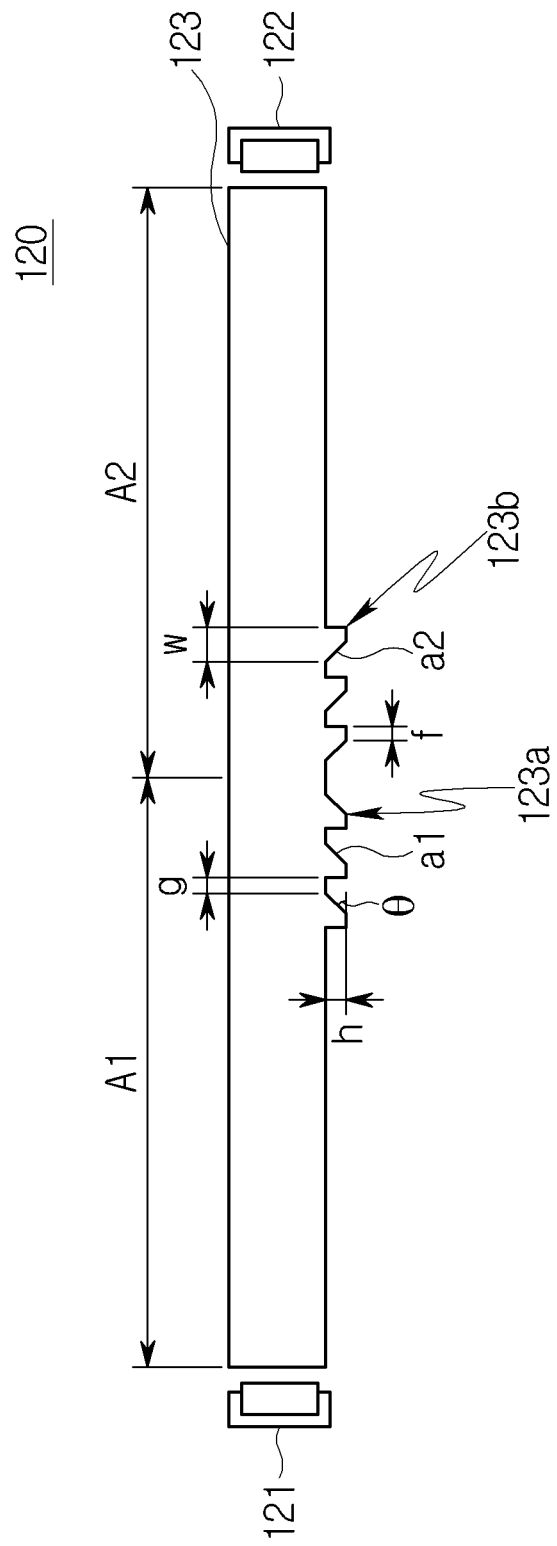
FIG. 3 is a cross-sectional view schematically illustrating a structure of a first backlight unit according to an embodiment of the present disclosure.

FIG. 1 is a cross-sectional view of a display device according to an embodiment. FIG. 2 is a rear perspective view schematically illustrating a structure of a first light guide plate in FIG. 1 according to an embodiment, and FIG. 3 is a cross-sectional view schematically illustrating a structure of a first backlight unit roughly in FIG. 1 according to an embodiment.

With reference to FIG. 1, a display device 1 according to an embodiment can include a display panel 110 including pixels to display an image, and first and second backlight units 120 and 130 disposed below the display panel 110 to emit light toward the front of the display panel 110. Also, the display device 1 can further include a panel guide, a top case, a bottom cover, or the like to house and secure the display panel 110 and the first and second backlight units 120 and 130. Also, the display device 1 can include a display panel including a plurality of subpixels, a plurality of data lines and a plurality of gate lines, a data driver configured to supply data voltages to the data lines, a gate driver configured to supply scan signals to the gate lines, and a controller (e.g., timing controller) configured to control the data driver and the gate driver.

The display panel 110 can be a liquid crystal panel that can include a lower substrate and an upper substrate bonded facing each other and a liquid crystal layer interposed therebetween.

The lower substrate can include gate lines and data lines arranged to cross each other and liquid crystal cells formed at crossing regions of the gate lines and the data lines. In an embodiment, the liquid crystal cells can be arranged in a matrix form on the lower substrate. The liquid crystal cells can include a thin film transistor (TFT) arranged at the intersection of the gate lines and the data lines and a pixel electrode that receives a data voltage supplied via the thin film transistor when the thin film transistor is turned on.

The upper substrate can include color filters for implementing multiple colors including red, green, and blue, black matrices that delimit the color filters and block light passing through the liquid crystal layer, and common electrodes for applying a voltage to the liquid crystal layer.

The common electrodes can be formed on the upper substrate in the vertical electric field driving methods such as Twisted Nematic (TN) mode and Vertical Alignment (VA) mode, and can be formed on the lower substrate with the pixel electrodes in the horizontal electric field driving methods such as In-Plane Switching (IPS) mode and Fringe Field Switching (FFS) mode.

The liquid crystal cells are driven by the potential difference between the data voltage supplied to the pixel electrodes through the data lines and the common voltage supplied to the common electrodes, resulting in an electric field to adjust the amount of light transmitted through the display panel 110.

The first and second backlight units 120 and 130 are disposed beneath the display panel 110 to provide light to the display panel 110. The first backlight unit 120 is disposed beneath the display panel 110, and the second backlight unit 130 can be disposed beneath the first backlight unit 120.

The first backlight unit 120 can include a first light source package 121, a second light source package 122, and a first light guide plate 123.

The first and second light source packages 121 and 122 can be powered and driven by an external power source to produce light. The first and second light source packages 121 and 122 can generate light using various light sources, such as cold cathode fluorescent lamp (CCFL), external electrode fluorescent lamp (EEFL), hot cathode fluorescent lamp (HCFL), and light emitting diode (LED).

The first and second light source packages 121 and 122 are arranged to face each other. In this situation, the first and second light source packages 121 and 122 can be arranged to face at least one side of the first light guide plate 123. For example, the first light source package 121 can be disposed on one side of the first light guide plate 123, and the second light source package 122 can be disposed on the other side of the first light guide plate 123, facing the first light source package 121. For example, first and second light source packages 121 and 122 can be arranged on opposite sides of the first light guide plate 123, but embodiments are not limited thereto. Accordingly, the light emitted from the first and second light source packages 121 and 122 can be incident on the sides of the first light guide plate 123 (e.g., an edge-lit back light unit).

The first light guide plate 123 is interposed between the first and second light source packages 121 and 122. For instance, the first light guide plate 123 is disposed between the first and second light source packages 121 and 122, facing the first and second light source package 121 and 122, to guide the light incident from the first and second light source package 121 and 122 and emit the light through the top surface.

In an embodiment, the first light guide plate 123 can be made of a transparent material, such as a plastic material selected from the group consisting of polymethyl methacrylate (PMMA) and polycarbonate (PC). However, the material of the first light guide plate 123 is not limited to those mentioned above, and the first light guide plate 123 can be fabricated with other materials as well.

With reference to FIGS. 2 and 3, the first light guide plate 123 can include first patterns 123a and second patterns 123b that protrude from the bottom surface of the first light guide plate 123. The first patterns 123a and second patterns 123b can be formed on the bottom surface of the first light guide plate 123 in a relief manner by a molding or printing method.

In an embodiment, the first patterns 123a and second patterns 123b can be formed over the entire bottom surface of the first light guide plate 123 or in at least one region or partial regions. For example, the first patterns 123a can be formed in a first area A1 adjacent to the first light source package 121 on the first light guide plate 123. The second patterns 123b can be formed in the second area A2 adjacent to the second light source package 122 on the first light guide plate 123. In this situation, the first and second areas A1 and A2 are defined as regions adjacent to each other, and the first patterns 123a and second patterns 123b can be arranged adjacent to each other at the boundary between the first and second areas A1 and A2 on the first light guide plate 123.

The first patterns 123a and second patterns 123b can be identical or similar to each other in shape. For example, the first patterns 123a and second patterns 123b can have a mirrored shape based on the boundary between the first and second areas A1 and A2 (e.g., the first patterns 123a and second patterns 123b can be disposed in a symmetrical arrangement based on the boundary between the first and second areas A1 and A2).

The first patterns 123a can face the first backlight unit 120 and include at least one first inclined surface a1 having a predetermined inclination angle relative to the bottom surface of the first light guide plate 123. Similarly, the second patterns 123b can face the second light source package 122 and include at least one second inclined surface a2 having a predetermined inclination angle relative to the bottom surface of the first light guide plate 123. In an embodiment, the inclination angle θ is about 300 to 500 and preferably 40°, but is not limited thereto.

In this embodiment, the cross-section of the first patterns 123a and second patterns 123b can each have an asymmetric trapezoid shape with the aforementioned inclined surfaces a1 and a2 as the inclined sides. However, the profile is not limited to this embodiment, and the cross-sections of the first patterns 123a and second patterns 123b can have various shapes such as asymmetric triangles or polygons with the aforementioned inclined surfaces a1 and a2 as the sides.

The first patterns 123a and second patterns 123b are spaced apart at similar intervals and can have a long bar shape extending parallel to the sides adjacent to the light source packages 121 and 122. However, without being limited to this embodiment, the first patterns 123a and second patterns 123b can have long or short bar or dot shapes that are arranged regularly or irregularly spaced apart or dispersed.

The first and second patterns 123a and 123b can have the height h of approximately 40 to 60 um, and preferably 50 um. The first and second patterns 123a and 123b can have the width w of approximately 110 to 130 um, and preferably 120 um. The first and second patterns 123a and 123b can have the spacing g of approximately 40 to 60 um, and preferably 50 um. Meanwhile, when the first patterns 123a and second patterns 123b have an asymmetric trapezoidal shape as depicted, the width f of the narrow lower side of the trapezoid can be approximately 20 to 40 um, and preferably 30 um. However, the numerical values of the first patterns 123a and second patterns 123b are not limited to those described in this embodiment.

The light incident from the first and second light source packages 121 and 122 onto the first light guide plate 123 can be controlled by the first and second patterns 123a and 123b formed on the bottom surface thereof, to emit light in a controlled area. In detail, the light emitted from the first light source package 121 and guided through the first light guide plate 123 is refracted by the first inclined surface a1 of the first patterns 123a and emitted through the top surface. That is, the light emitted from the first light source package 121 is blocked from being guided to the second area A2. As a result, the emission of light from the second area A2 can be restricted.

Similarly, the light emitted from the second light source package 122 and guided through the first light guide plate 123 is refracted by the second inclined surface a2 of the second patterns 123b and emitted through the top surface, being blocked from being guided to the first area A1. As a result, the emission of light from the first area A1 can be restricted.

According to an embodiment, the first backlight unit 120 can further include a first diffusion sheet, a first prism sheet, and a first light control film.

For example, the first diffusion sheet and the first prism sheet can be further disposed on the first light guide plate 123. The first diffusion sheet can diffuse the light emitted from the first light guide plate 123 to provide luminance uniformity according to the viewing angle. The first diffusion sheet can be formed of polyethylene terephthalate (PET) or Polycarbonate (PC) resin and can additionally include a particle coating layer that serves as diffusion. The first prism sheet can concentrate the direction of light emitted from the first light guide plate 123 or the first diffusion sheet to be close to the perpendicular direction of the display panel 110, thereby improving the front luminance of the display panel 110.

The first light control film LCF can be placed on the first prism sheet. The first light control film LCF can control the light emission profile of the first backlight unit 120 in conjunction with the first pattern 123a. For example, the first light control film can control the horizontal and/or vertical viewing angle of light emitted from the first backlight unit 120 to have a narrow viewing angle.

Underneath the first backlight unit 120, the second backlight unit 130 is arranged (e.g., two separate backlight units can be configured in a stacked arrangement). The second backlight unit 130 can include a third light source package 131 and a second light guide plate 132.

The third light source package 131 can be driven by power supplied from the outside to generate light. The third light source package 131 can generate light using various light sources, such as cold cathode fluorescent lamp (CCFL), external electrode fluorescent lamp (EEFL), hot cathode fluorescent lamp (HCFL), and light emitting diode (LED).

The third light source package 131 is arranged to face at least one side of the second light guide plate 132. Accordingly, the light emitted from the third light source package 131 can be incident on the side of the second light guide plate 132 (e.g., an edge-lit backlight unit). In an embodiment, the third light source package 131 can be arranged on the same side as one of the first and second light source packages 121 and 122. For example, the first light source package 121 can be arranged on the same side as the display device 1. However, this embodiment is not limited thereto. Also, according to another embodiment, the third light source package 131 can be disposed at more than one side of the second light guide plate 132 (e.g., light sources disposed at opposite sides of the second light guide plate 132).

The second light guide plate 132 is arranged to face the third light source package 131 and guides the light incident from the third light source package 131 to emit through the top surface. In an embodiment, the first light guide plate 132 can be made of a transparent material, such as a plastic material selected from the group consisting of polymethyl methacrylate (PMMA) and polycarbonate (PC).

According to an embodiment, the second backlight unit 130 can further include a second light control film.

For example, the second light control film can be additionally arranged on the second light guide plate 132. The second light control film can control the light emission profile of the second backlight unit 130. For example, the first light control film can control the horizontal and/or vertical viewing angle of light emitted from the second backlight unit 130 the have a narrow viewing angle.

A light path control pattern 140 can be arranged between the first and second backlight units 120 and 130. The light path control pattern 140 can include a light shielding pattern 142 patterned at regular intervals within a transmission layer 141.

The transmission layer 141 can protect the light shielding pattern 142 and flatten the top surface of the light path control pattern 140 by removing any unevenness caused by the light shielding pattern 142 (e.g., transmission layer 141 can act as a type of planarization layer). The transmission layer 141 can be made of a transparent material with a high transmittance, such as polyethylene terephthalate (PET), polycarbonate (PC), optical clear adhesive (OCA), ultraviolet (UV) resin, photoresist resin, polyurethane resin, acrylic resin, silicon oxide, or any combination of two or more thereof. The transmission layer 141 can allow light incident from the second backlight unit 130 to pass in the opposite direction, e.g., through to the first backlight unit 120.

The light shielding pattern 142 can have a bar shape elongated along the thickness direction of the light path control pattern 140. The width of the light shielding pattern 142 in the thickness direction can be constant or variable. For example, the light shielding pattern 142 can have a cross-section of a trapezoidal shape with a wide width on one side adjacent to the second backlight unit 130 and a narrow width on the opposite side adjacent to the first backlight unit 120, the wide width being wider than the narrow width, as shown FIG. 1. However, the profile is not limited to this embodiment, the light shielding pattern 142 can be formed with a uniform width or with an inverted trapezoidal shape in various other embodiments.

The light shielding pattern 142 can be formed in the shape of a recessed groove that penetrates all the way through the light path control pattern 140 or does not penetrate the light path control pattern 140 (e.g., a grove that extends partially into the light path control pattern 140). The light shielding pattern 142 can be made of colored optical absorption material. For example, the light shielding pattern 142 can be composed of electronic ink containing black particles and the light shielding pattern 142 can block light emitted from the third light source package 131.

The light incident on the light path control pattern 140 passes to the front through the gaps between the light shielding patterns 142 and is blocked by the light shielding patterns 142 on the sides. Therefore, the light entering the light path control pattern 140 can be controlled within a narrow angle range with respect to the front of the light path control pattern 140.

Hereinafter, a description is made of an embodiment in which the side viewing angle of the display device 1 is controlled via the first backlight unit 120 configured as described above.

FIGS. 4 to 7 are cross-sectional views illustrating various modes of a display device according to an embodiment. In the embodiments of FIGS. 4 to 7, the display device 1 is installed in a vehicle. The display device 1 can be integrated or detachably installed on the dashboard of a vehicle or in a center console of a vehicle. In this embodiment, particularly, the display device 1 can be installed on the dashboard in an area other than the front of the driver's seat where the instrument panel is displayed (e.g., the display device 1 can be in front of a passenger seat or in a center area of the dashboard).

In the embodiment, the display device 1 can display graphical user interfaces (GUIs) corresponding to navigation, video content, and audio content in response to the driving status and/or user requests.

In particular, the display device 1 can selectively operate in privacy viewing mode while the vehicle is in operation. For example, the display device 1 can operate in privacy viewing mode when displaying videos or other content that may be distracting to the driver while driving. In contrast, the display device 1 can operate in a share viewing mode during non-driving periods of the vehicle (e.g., where the driver and the passenger are both able to view images on the display). For example, the display device 1 can dynamically switch between a share viewing mode that has a wide viewing angle and a privacy viewing more that has a narrow viewing angle. The display device 1 can also operate in the share viewing mode even while the vehicle is in operation. For example, the display device 1 can operate in the share viewing mode when displaying videos that are deemed to assist the user's driving, such as navigation or when providing emergency or safety information.

Figure 4:
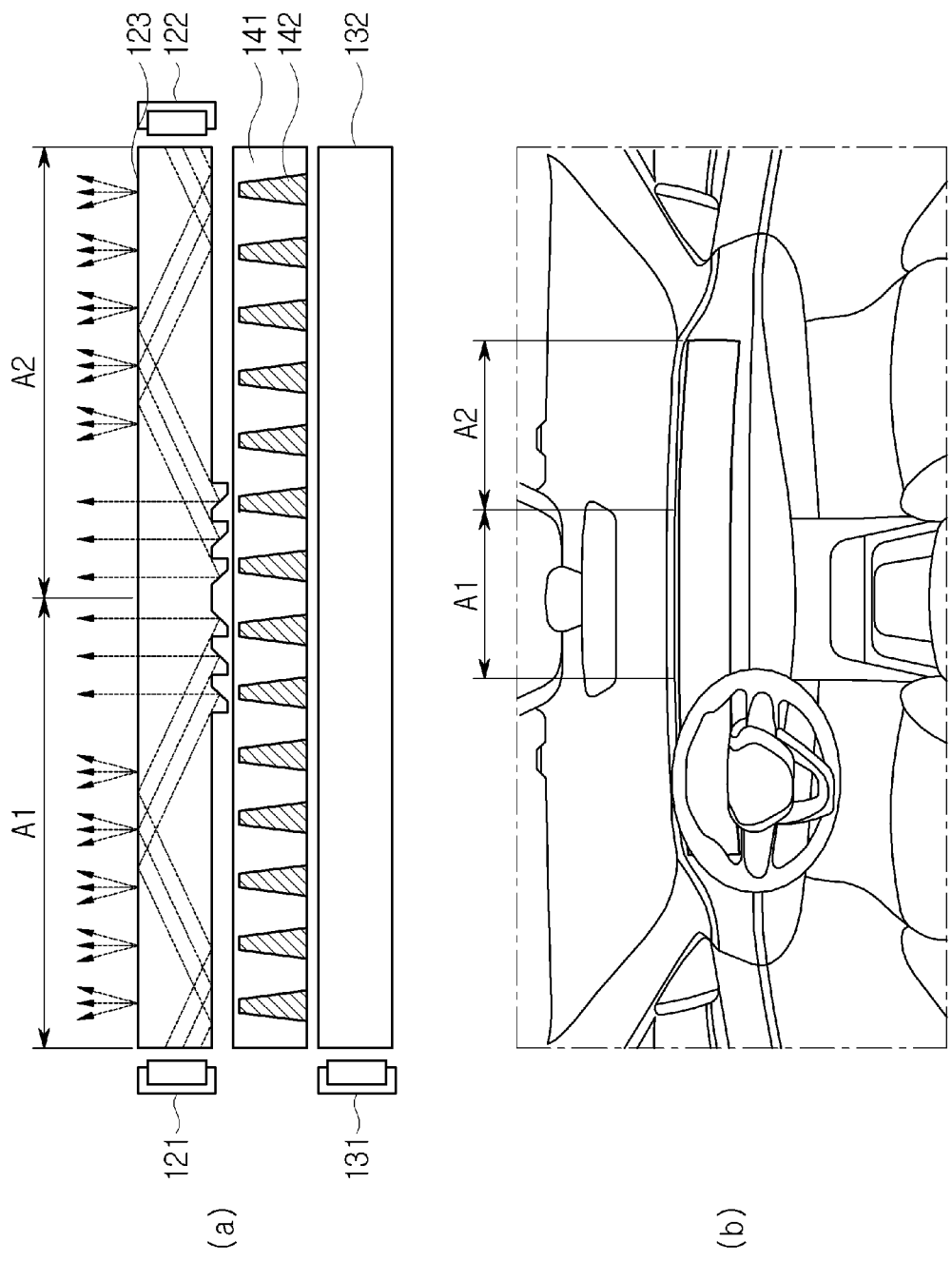

With reference to part (a) of FIG. 4, when the display device 1 operates in a first mode (e.g., share viewing mode), the first and second light source packages 121 and 122 of the first backlight unit 120 are turned on. The third light source package 131 of the second backlight unit 130 can be turned off.

The light generated from the first light source package 121 is guided to the first area A1 through the first light guide plate 123, while being blocked from entering the second area A2 by the first pattern 123*a*. Similarly, the light generated from the second light source package 122 is guided to the second area A2 through the first light guide plate 123, while being blocked from entering the first area A1 by the second pattern 123*b*.

As a result, the light generated from the first and second light source packages 121 and 122 is emitted through the top surface in both the first and second areas A1 and A2, and an image can be displayed through the entire area of the first display panel 110. As such, when the first and second light source packages 121 and 122 are turned on, a share viewing mode can be implemented such that the viewing angle is entirely open to the front and sides of the display device 1, as shown in part (b) of FIG. 4. In the share viewing mode, users in both the driver's seat and the passenger's seat can view all the images displayed on the entire area of the display device 1 and a wide viewing angle can be provided.

With reference to part (a) of FIG. 5, when the display device 1 operates in a second mode (e.g., privacy viewing mode), the third light source package 131 of the second backlight unit 130 is turned on. The first and second light source packages 121 and 122 of the first backlight unit 120 can be turned off.

The light generated from the third light source package 131 can be guided through the second light guide plate 132 and emitted from the front surface of the second light guide plate 132. The emitted light can be controlled within a narrow viewing angle range by the light shielding pattern 142, passing through the light path control pattern 140. As a result, a first privacy mode can be implemented where the viewing angle for the front of the display device 1 is open while the viewing angle for the sides is limited, as shown in part (b) of FIG. 5, in order to provide a narrow viewing angle (e.g., this can help reduce reflections on other objects, such as windows, which can be especially helpful during night driving, but the driver may still view the images on the display, this can also prevent people from outside of the vehicle from easily viewing what is being displayed). Also, the privacy viewing mode can be engaged based on a user request, but also, the privacy viewing mode can be automatically engaged based on preset conditions, e.g., at a specific timing such as after sunset, when ambient light is sensed below a threshold, or when the vehicle drives faster than a preset speed limit etc., but embodiments are not limited thereto.

In the first privacy mode, users in both the driver's seat and the passenger's seat can only view the images displayed on the front of the display device 1. That is, the user in the driver's seat can only view partial images displayed on the display device 1 from the front of the driver's seat (e.g., navigation, dashboard, etc.). In other words, the user in the passenger's seat may only be able to see portions of what is displayed in front of the driver and the passenger's view may be restricted.

Figure 6:
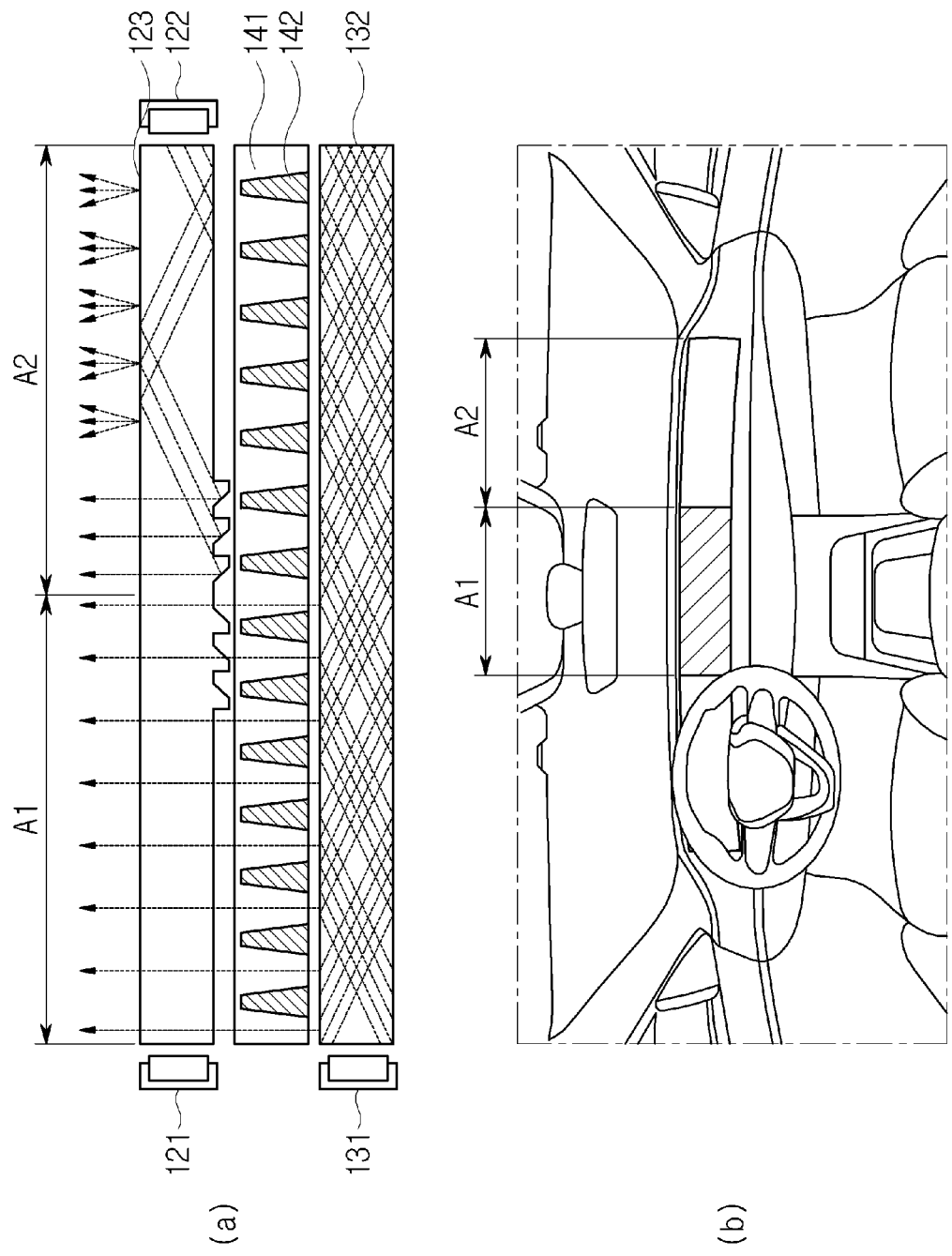

With reference to part (a) of FIG. 6, when the display device 1 operates in a third mode, the second light source packages 122 of the first backlight unit 120 and the third light source package 131 of the second backlight unit 130 are turned on. The first light source package 121 of the first backlight unit 120 can be turned off.

Similarly, the light generated from the second light source package 122 is guided to the second area A2 through the first light guide plate 123, while being blocked from entering the first area A1. Accordingly, the light generated from the second light source package 122 is emitted through the top surface in the second area A2. Therefore, the viewing angle can be entirely open to the front and sides of the display device 1 in the second area A2. For example, the second area A2 can have a wide viewing angle while the second area A1 has a narrow viewing angle. The third mode can be referred to as a mixed viewing mode, in which a privacy viewing mode is provided to the driver, while the passenger is provided with the share viewing mode.

The light generated from the third light source package 131 can be guided through the second light guide plate 132 and emitted through the top surface of the second light guide plate 132. The emitted light can be controlled within a narrow viewing angle range by the light shielding pattern 142, passing through the light path control pattern 140. Accordingly, as shown in part (b) of FIG. 6, the viewing angle for the front of the display device 1 can be open and the viewing angle for the sides can be limited in the first area A1 (e.g., a narrowing viewing angle can be provided for just the driver).

As such, the third mode is a partial privacy mode or a mixed viewing mode (third privacy mode) where the display device 1 can operate such that the privacy mode having a narrow viewing angle is implemented only in the first area A1 while the second area A2 can be operated with a wide viewing angle.

Figure 7:
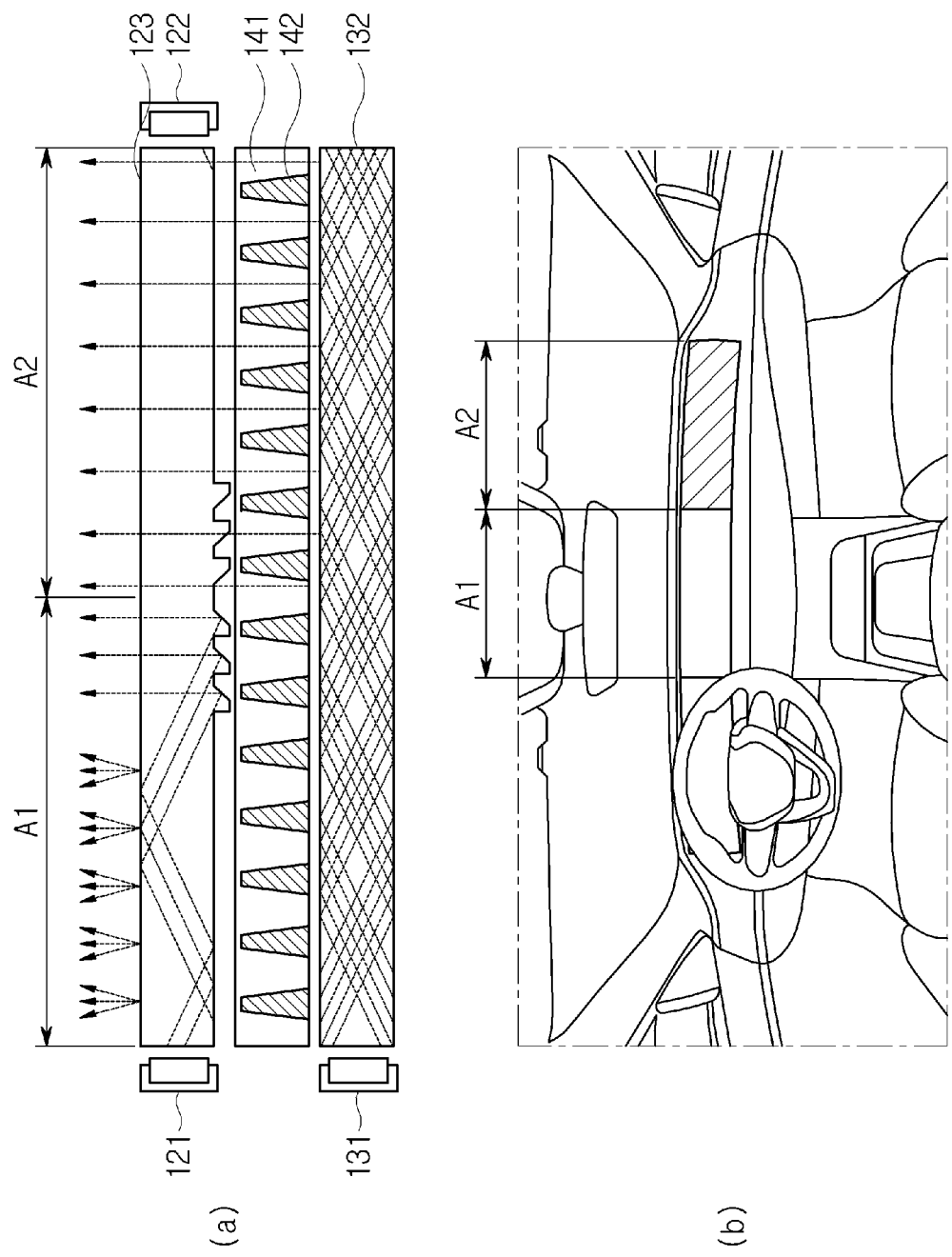

With reference to part (a) of FIG. 7, when the display device 1 operates in a fourth mode (e.g., another type of mixed viewing mode or partial privacy mode), the first light source package 121 of the first backlight unit 120 and the third light source package 131 of the second backlight unit 120 are turned on. The second light source package 122 of the first backlight unit 120 can be turned off.

The light generated from the first light source package 121 is guided to the first area A1 through the first light guide plate 123, while being blocked from entering the second area A2. Accordingly, the light emitted from the first light source package 121 is emitted through the top surface in the second area A1. Therefore, the viewing angle can be entirely open to the front and sides of the display device 1 in the first area A1 and the driver can be provided with a wide viewing angle.

The light generated from the third light source package 131 can be guided through the second light guide plate 132 and emitted through the top surface of the second light guide plate 132. The emitted light can be controlled within a narrow viewing angle range by the light shielding pattern 142, passing through the light path control pattern 140. Accordingly, as shown in part (b) of FIG. 7, the viewing angle for the front of the display device 1 can be open and the viewing angle for the sides can be limited in the second area A2 (e.g., a narrow viewing angle can be provided to the passenger, which can help avoid distracting the driver).

As such, the fourth mode is a partial privacy mode or mixing viewing mode (fourth privacy mode) where the display device 1 can operate such that the privacy mode is implemented only in the second area A2. Thus, the specific configuration of the stacked backlight units with the light path control pattern disposed therebetween, a controller in the display device 1 can control the back light units to provide at least four different viewing modes, such as 1) share viewing mode having a wide viewing angle for both the first area A1 and the second area A2, 2) privacy viewing mode having a narrow viewing angle for both the first area A1 and the second area A2, 3) first mixed viewing mode having a narrow viewing angle for the first area A1 and a wide viewing angle for the second area A2, and 4) a second mixed viewing mode having a wide viewing angle for the first area A1 and a narrow viewing angle for the second area A2. In this way, the display device 1 can be selectively switched between four different viewing modes using the same liquid crystal display screen.

Also, according to another embodiment, the display device 1 can provide a high luminance mode in which the first light source package 121, the second light source package 122 and the third light source package 131 are all turned on at the same time (e.g., this can be helpful when the ambient light is bright, such as on sunny days or during emergency situations, etc.).

Figure 8:
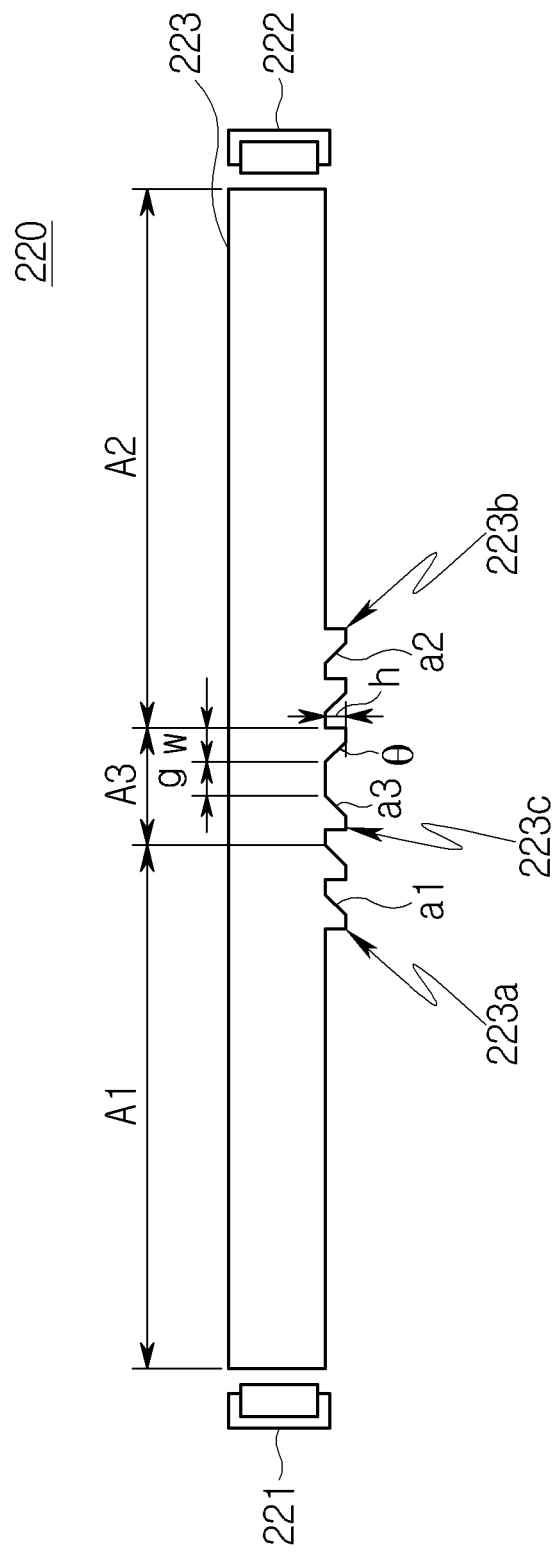
FIG. 8 is a cross-sectional view schematically illustrating a structure of a first backlight unit according to another embodiment of the present disclosure.

FIG. 8 is a cross-sectional view schematically illustrating a structure of a first backlight unit according to another embodiment.

With reference to FIG. 8, the first backlight unit 220 can include a first light source package 221, a second light source package 222, and a first light guide plate 223.

The first light guide plate 223 is interposed between the first and second light source packages 221 and 222. The first light guide plate 223 is disposed between the first and second light source packages 221 and 222, facing the first and second light source packages 221 and 222, to guide the light incident from the first and second light source package 221 and 222 and emit the light through the top surface.

The first light guide plate 223 can include first patterns 223a and second patterns 223b that protrude from the bottom surface of the first light guide plate 223. The first patterns 223a and second patterns 223b can be formed on the bottom surface of the first light guide plate 223 in a relief manner by a molding or printing method. According to another embodiment, the first patterns 223a and second patterns 223b can be formed as a series of grooves etched into bottom surface of the first light guide plate 223.

In an embodiment, the first patterns 223a and second patterns 223b can be formed over the entire bottom surface of the first light guide plate 223 or in at least one region. For example, the first patterns 223a and second patterns 223b can be formed in the central area of the rear surface of the first light guide plate 223. However, this embodiment is not limited thereto.

The first patterns 223a can be formed in the first area A1 adjacent to the first light source package 221 on the first light guide plate 223. The second patterns 223b can be formed in the second area A2 adjacent to the second light source package 222 on the first light guide plate 223. The first patterns 223a and second patterns 223b can be identical or similar to each other in shape. For example, the first patterns 223a and second patterns 223b can have a mirrored shape or a symmetrical arrangement based on the boundary between the first and second areas A1 and A2.

The first patterns 223a can face the first light source package 221 and include at least one first inclined surface a1 having a predetermined inclination angle relative to the bottom surface of the first light guide plate 223. Similarly, the second patterns 223b can face the second light source package 222 and include at least one second inclined surface a2 having a predetermined inclination angle relative to the bottom surface of the first light guide plate 223. In an embodiment, the inclination angle is about 30° to 50° and preferably 40°, but is not limited thereto.

In this embodiment, the cross-section of the first patterns 223a and second patterns 223b can be an asymmetric trapezoid with the aforementioned inclined surfaces a1 and a2 as the vertical sides. However, the profile is not limited to this embodiment, and the cross-sections of the first patterns 223a and second patterns 223b can have various shapes such as asymmetric triangles or polygons with the aforementioned inclined surfaces a1 and a2 as the vertical sides.

The first patterns 223a and second patterns 223b are spaced apart at similar intervals and can have a long bar shape extending parallel to the sides adjacent to the light source packages 221 and 222. However, without being limited to this embodiment, the first patterns 223a and second patterns 223b can have long or short bar or dot shapes that are arranged regularly or irregularly spaced apart or dispersed.

In the embodiment of FIG. 8, the first light guide plate 123 further includes third patterns 223c formed on the rear surface of the first light guide plate 223 in a third area A3 between the first and second areas A1 and A2. In an embodiment, the third area A3 can include the central area of the first light guide plate 123. The first area A1, the third area A3, and the second area A2 can be defined as adjacent areas.

The third patterns 223c can be identical or similar in shape to the first and second patterns 223a and 223b. For example, some of the third patterns 223c can have the same shape as the first patterns 223a, and the remaining ones can have the same shape as the second patterns 223b.

The third inclined surface a3 of the third pattern 223c can have an inclination angle that is smaller than inclination angles of the inclined surfaces a1 and a2 of the first and second patterns 223a and 223b. For example, the inclination angle θ of the third inclined surface a3 of the third pattern 223c can be about 25° to 45°, preferably about 35°, but is not limited thereto.

The third patterns 223c can be formed to be smaller than the first and second patterns 223a and 223b and to have a narrow gap. For example, the third patterns 223c can have a height h of about 30 um to 50 um, preferably 40 um, the gap g of about 30 um to 50 um, preferably 40 um, therebetween.

The light incident from the first and second light source packages 221 and 222 onto the first light guide plate 223 can be controlled by the first and second patterns 223a and 223b formed on the bottom surface thereof, to emit in a controlled area. In detail, the light emitted from the first light source package 221 and guided through the first light guide plate 223 is refracted by the first inclined surface a1 of the first patterns 223a and emitted through the top surface. That is, the light emitted from the first light source package 221 is blocked from being guided to the second area A2. As a result, the emission of light from the second area A2 can be restricted.

Similarly, the light emitted from the second light source package 222 and guided through the first light guide plate 223 is refracted by the second inclined surface a2 of the second patterns 223b and emitted through the top surface, being blocked from being guided to the first area A1. As a result, the emission of light from the first area A1 can be restricted.

In the embodiment of FIG. 8, the light incident on the first light guide plate 223 from the first and second light source packages 221 and 222 is further refracted by the third inclined surface a3 of the third pattern 223c and emitted through the top surface.

The light is emitted perpendicularly to the top surface in the first area A1 or the second area A2. In the third area A3, the light can be emitted in lateral directions with respect to the top surface due to the small inclined angle of the third inclined surface a3 of the third patterns 223c. As a result, a problem in that images are perceived to have a discontinuity at the boundary between the first and second areas A1 and A2 due to the blocking of light guides by the first and second patterns 223a and 223b can be improved.

Figure 9:
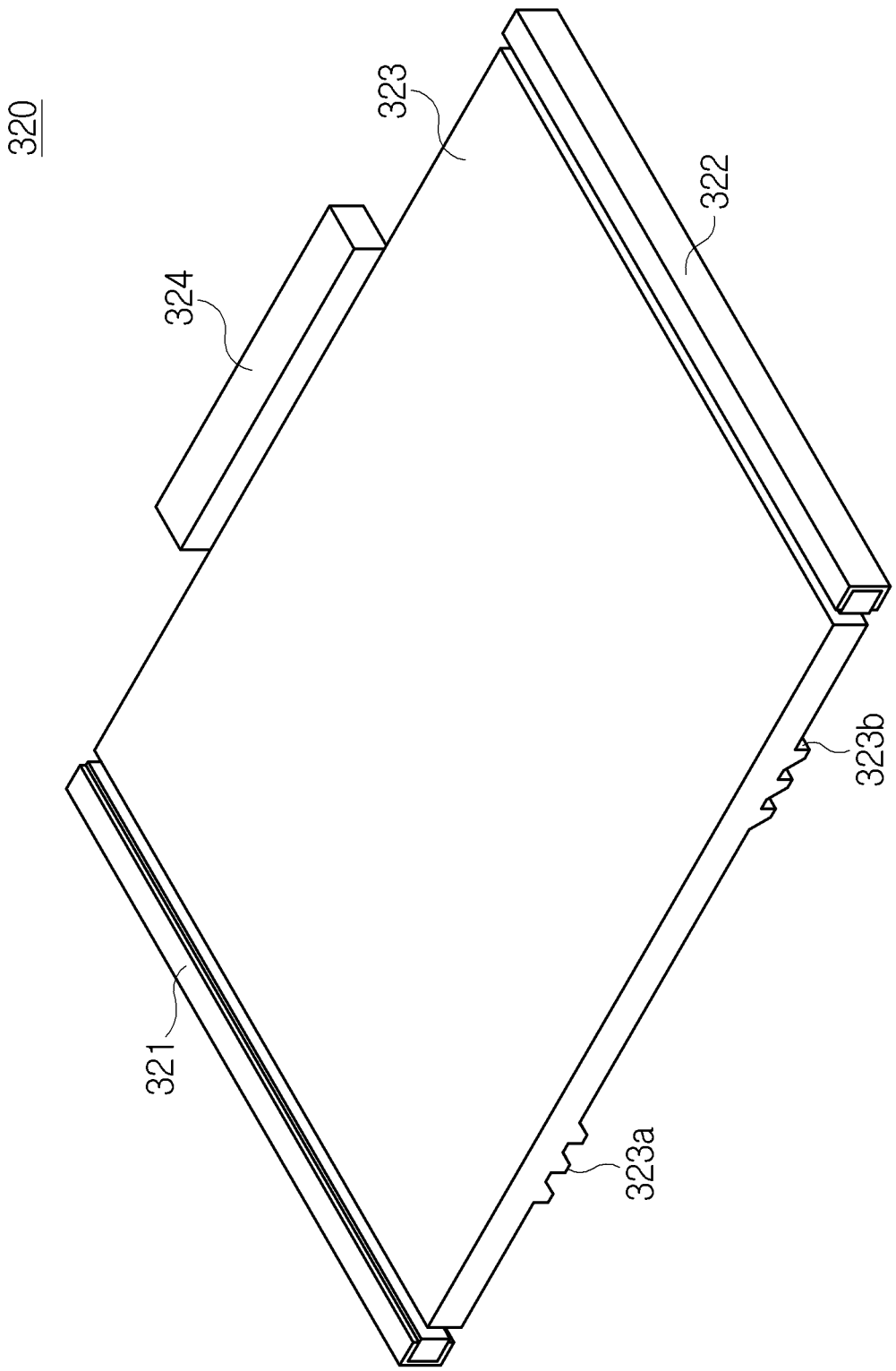
FIG. 9 is a perspective view schematically illustrating a structure of a first backlight unit according to another embodiment of the present disclosure.
Figure 10:
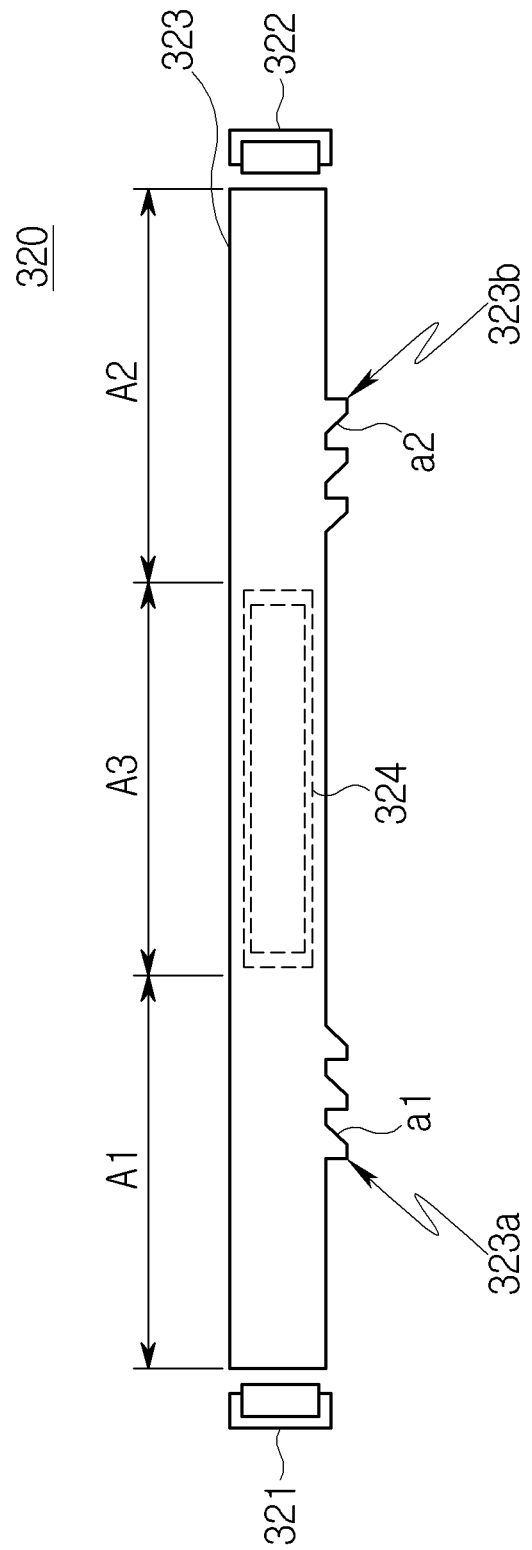
FIG. 10 is a cross-sectional view schematically illustrating a structure of a first backlight unit according to another embodiment of the present disclosure.

FIG. 9 is a perspective view schematically illustrating a structure of a first backlight unit according to another embodiment. FIG. 10 is a cross-sectional view schematically illustrating a structure of a first backlight unit according to another embodiment.

With reference to FIGS. 9 and 10, the first backlight unit 320 can include a first light source package 321, a second light source package 322, and a first light guide plate 323.

The first light guide plate 323 is interposed between the first and second light source packages 321 and 322. The first light guide plate 323 is disposed between the first and second light source packages 321 and 322, facing the first and second light source package 321 and 322, to guide the light incident from the first and second light source package 321 and 322 and emit the light through the top surface.

The first light guide plate 323 can include first patterns 323a and second patterns 323b formed to be protruded on the bottom surface thereof. The first patterns 323a and second patterns 323b can be formed on the bottom surface of the first light guide plate 323 in a relief manner by a molding or printing method.

In the embodiment of FIGS. 9 and 10, the first patterns 323a can be formed in a first area A1 adjacent to the first light source package 321 on the first light guide plate 323. The second patterns 323b can be formed in the second area A2 adjacent to the second light source package 322 on the first light guide plate 323. Here, the first and second areas A1 and A2 are defined as sufficiently spaced apart areas, and a third area A3 can be defined between the first and second areas A1 and A2. The first patterns 323a and second patterns 323b are formed by being sufficiently spaced apart from each other as the first and second areas A1 and A2 are spaced apart.

The first patterns 323a and second patterns 323b can be identical or similar to each other in shape. For example, the first patterns 323a and second patterns 323b can have a mirrored shape or symmetrical arrangement based on the boundary between the first and second areas A1 and A2.

The first patterns 323a can face the first light source package 321 and include at least one first inclined surface a1 having a predetermined inclination angle relative to the bottom surface of the first light guide plate 323. Similarly, the second patterns 323b can face the second light source package 322 and include at least one second inclined surface a2 having a predetermined inclination angle relative to the bottom surface of the first light guide plate 323. In an embodiment, the inclination angle is about 30° to 50° and preferably 40°, but is not limited thereto.

In this embodiment, the cross-section of the first patterns 323a and second patterns 323b can be an asymmetric trapezoid shape with the aforementioned inclined surfaces a1 and a2 as the sides. However, the profile is not limited to this embodiment, and the cross-sections of the first patterns 323a and second patterns 323b can have various shapes such as asymmetric triangles or polygons with the aforementioned inclined surfaces a1 and a2 as the sides.

The first patterns 323a and second patterns 323b are spaced apart at similar intervals and can have a long bar shape extending parallel to the sides adjacent to the light source packages 321 and 322. However, without being limited to this embodiment, the first patterns 323a and second patterns 323b can have long or short bar or dot shapes that are arranged regularly or irregularly spaced apart or dispersed.

In the embodiment of FIGS. 9 and 10, the first backlight unit 320 can further include a fourth light source package 324. The fourth light source package 324 can be disposed on one side of the first light guide plate 323 where the first and second light source packages 321 and 322 are not arranged. For example, the fourth light source package 324 can be disposed on a side of the third area A3 where the first pattern 323a and the second pattern 323b are not formed.

The light generated from the fourth light source package 324 can be guided through the first light guide plate 323 and emitted through the top surface in the third area A3. The light emitted from the fourth light source package 324 can always be emitted through the top surface in the central area because the guiding path is not blocked by the first patterns 323a or the second patterns 323b. Therefore, by using the fourth light source package 324, it is possible to control the mode such that an image can be displayed in the central area of the display panel 110. For example, with the addition of the fourth light source package 324, a controller in the display device 3 can selectively control the display device 3 to operate in six different display modes, which will be described in more detail below.

FIGS. 11 to 16 are cross-sectional views illustrating various modes of a display device according to another embodiment. In FIGS. 11 to 16, the fourth light source package 324 is not depicted for convenience of explanation.

In the embodiment of FIGS. 11 to 16, the display device 1 is installed in a vehicle. The display device 1 can be integrated or detachably installed on the dashboard or the center console of a vehicle. Particularly in this embodiment, the display device 3 can be installed on the dashboard in an area other than the front of the driver's seat where the instrument panel is displayed.

In the embodiment, the display device 3 can display graphic user interfaces (GUIs) corresponding to navigation, video content, and audio content in response to the driving status and/or user requests.

In particular, the display device 3 can operate in a privacy viewing mode while the vehicle is in operation. For example, the display device 3 can operate in the privacy viewing mode when displaying videos or other content that can be deemed distracting to the user while driving. In contrast, the display device 3 can operate in a share viewing mode during non-driving periods of the vehicle. The display device 3 can also operate in the share viewing mode even while the vehicle is in operation. For example, the display device 3 can operate in the share viewing mode when displaying videos that are deemed to assist the user's driving, such as navigation.

Figure 11:
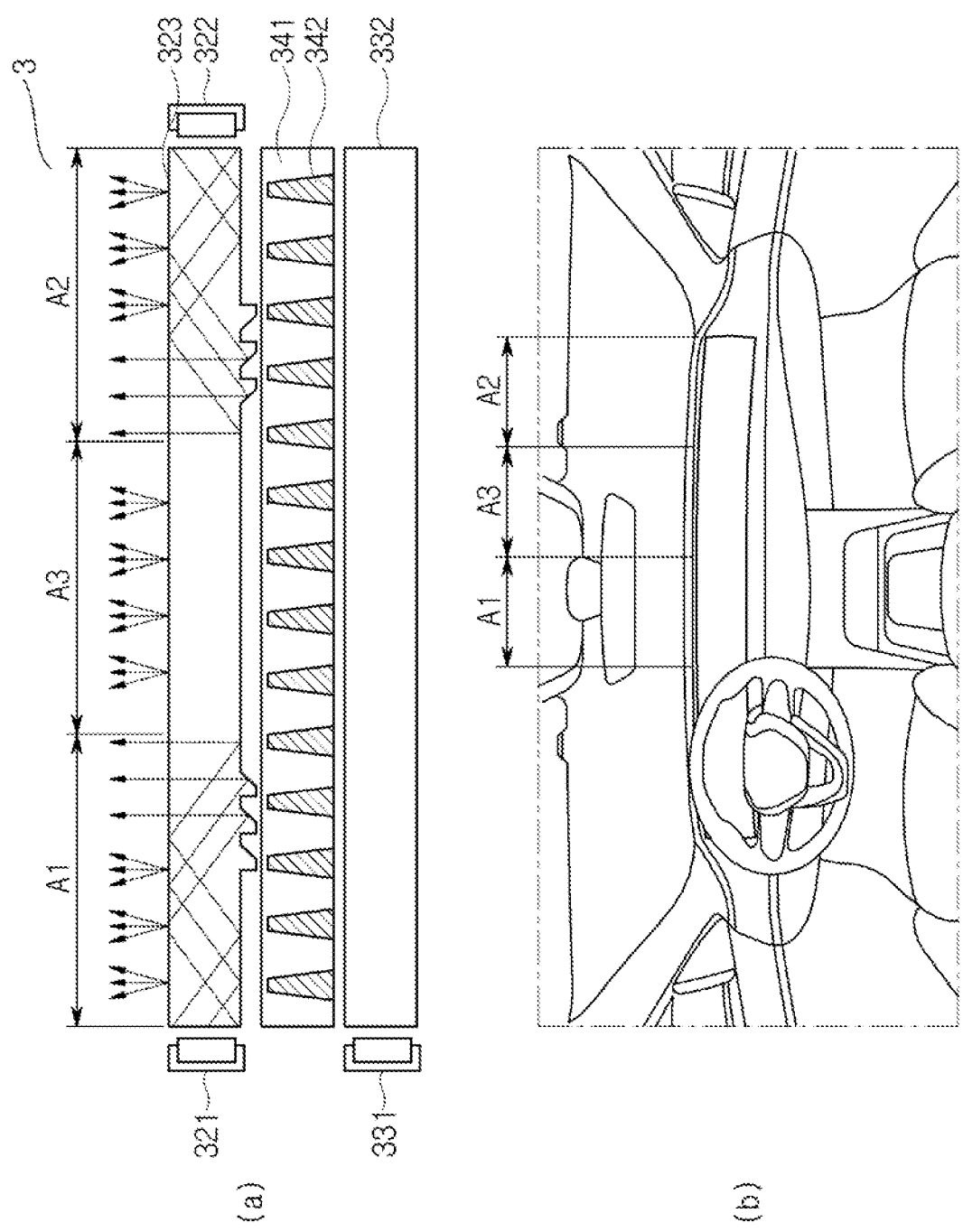
FIGS. 11 to 16 are cross-sectional views illustrating various modes of a display device according to another embodiment of the present disclosure.

With reference to part (a) of FIG. 11, when the display device 3 operates in a first mode, the first and second light source packages 321 and 322 of the first backlight unit 320 are turned on. In addition, the fourth light source package 324 of the first backlight unit 320 can be turned on. The third light source package 331 of the second backlight unit 330 can be turned off.

The light generated from the first light source package 321 is guided to the first area A1 through the first light guide plate 323, while being blocked from entering the second area A2 by the first pattern 323*a*. Similarly, the light generated from the second light source package 322 is guided to the second area A2 through the first light guide plate 323, while being blocked from entering the first area A1 by the second pattern 323*b*.

As a result, the light generated from the first and second light source packages 321 and 322 is emitted through the top surface in both the first and second areas A1 and A2. The light generated from the fourth light source package 324 can be guided through the first light guide plate 323 and emitted through the top surface in the third area A3 as the central area. As a result, an image can be output through the entire area of the first display panel 310.

As such, when the first and second light source packages 321 and 322 are turned on, a share viewing mode can be implemented such that the viewing angle is open to the entire front and sides of the display device 3, as shown in part (b) of FIG. 11. In the share viewing mode, users in both the driver's seat and the passenger's seat can view all the images displayed on the entire area of the display device 3. For example, all of the first display area A1, the third display area A3 and the second display area A2 can provide a wide viewing angle.

Figure 12:
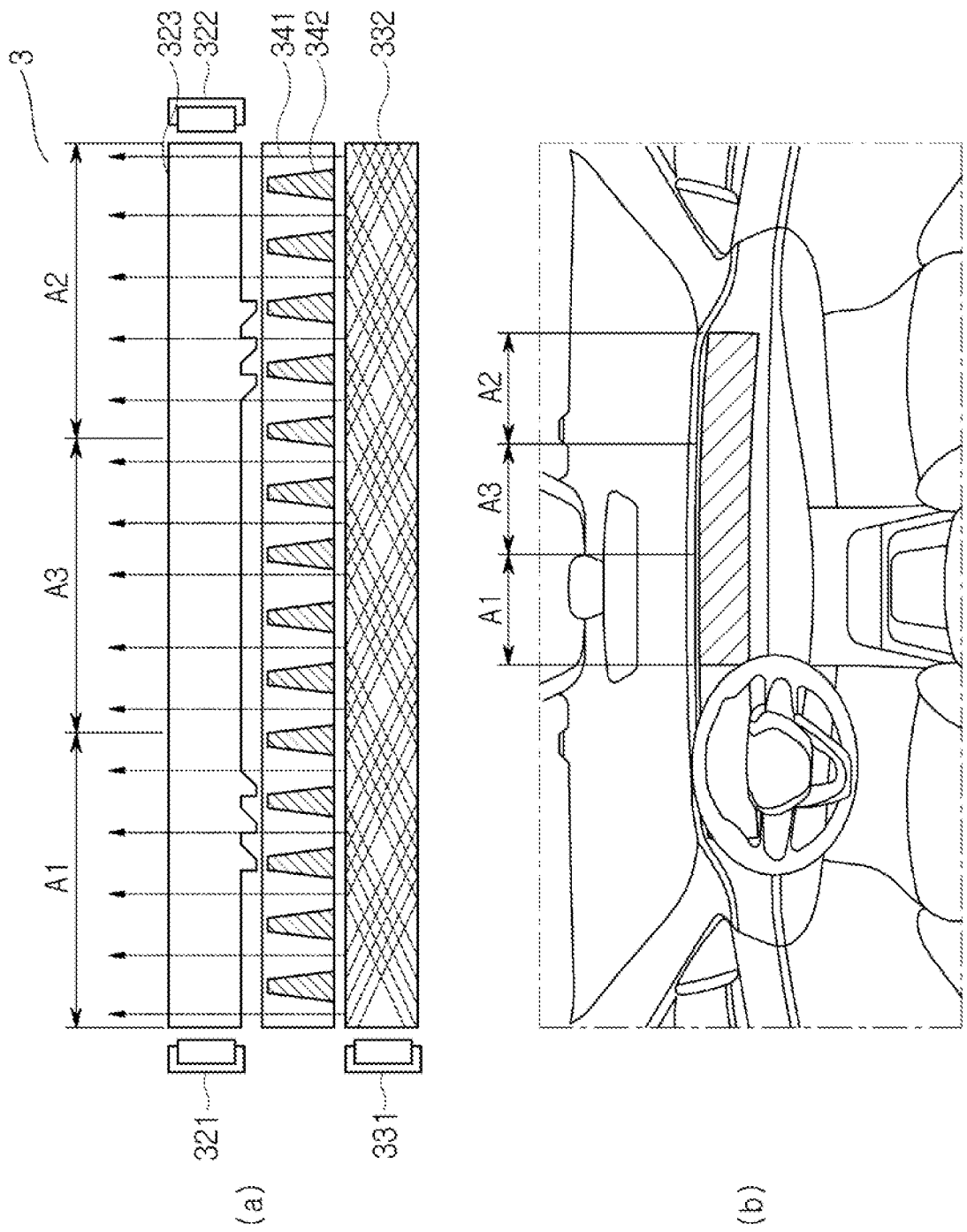

With reference to part (a) of FIG. 12, when the display device 3 operates in a second mode, the third light source package 331 of the second backlight unit 330 is turned on. The first, second, and fourth light source packages 321, 322, and 324 of the first backlight unit 320 can be turned off.

The light generated from the third light source package 331 can be guided through the second light guide plate 332 and emitted through the top surface of the second light guide plate 332. The emitted light can be controlled within a narrow angle range by the light shielding pattern 342, passing through the light path control pattern 340. As a result, a first privacy mode can be implemented where the viewing angle for the front of the display device 3 is open while the viewing angle for the sides is limited, as shown in part (b) of FIG. 12. For example, all of the first display area A1, the third display area A3 and the second display area A2 can provide a narrow viewing angle.

In the first privacy mode, users in both the driver's seat and the passenger's seat can only view the images displayed on the display device 3 in front of them. That is, the user in the driver's seat can only view partial images displayed on the display device 3 from the front of the driver's seat (e.g., navigation, dashboard, etc.).

Figure 13:
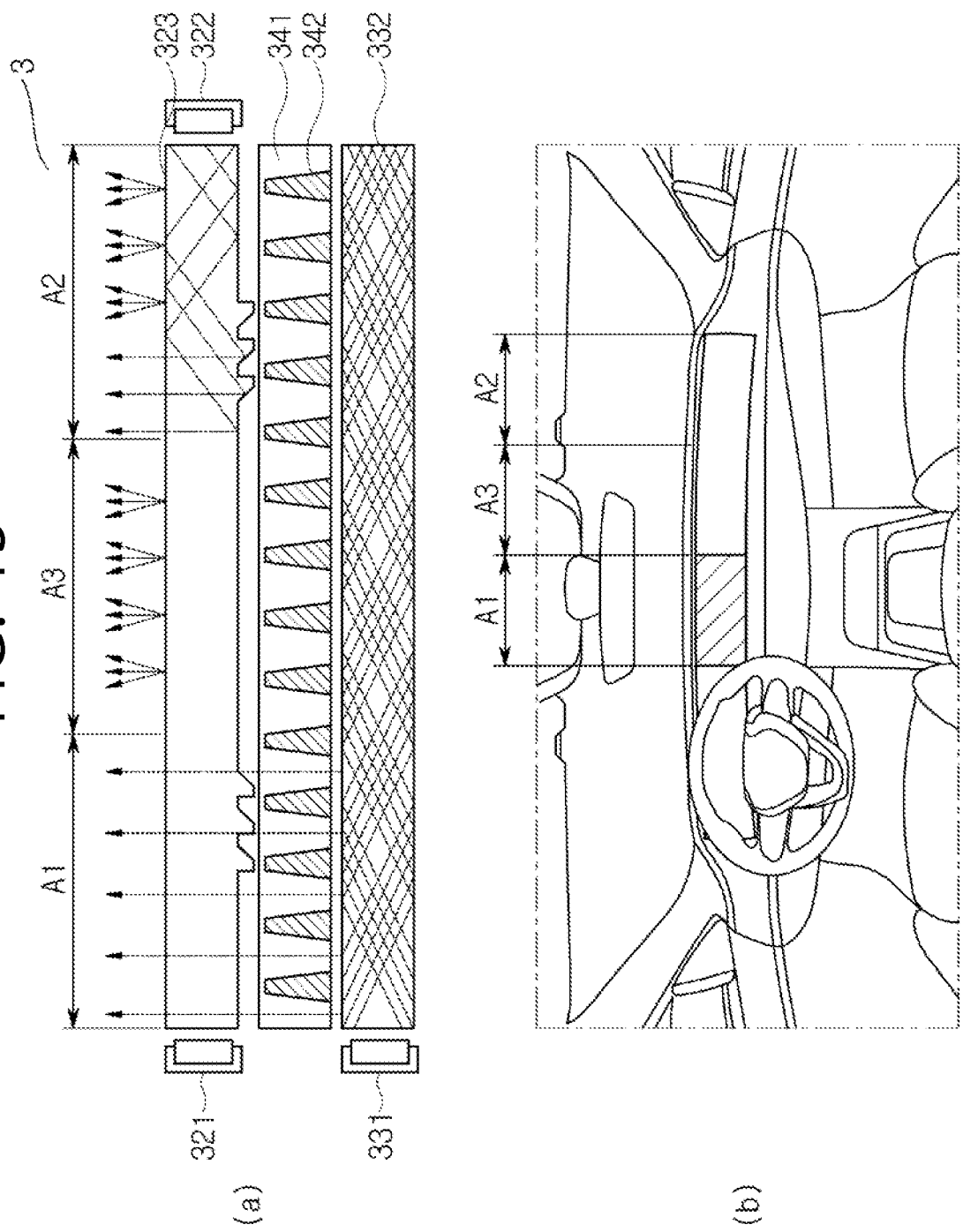

With reference to part (a) of FIG. 13, when the display device 3 operates in a third mode, the second and fourth light source packages 322 and 324 of the first backlight unit 320 and the third light source package 331 of the second backlight unit 330 are turned on. The first light source package 321 of the first backlight unit 320 can be turned off.

The light generated from the second light source package 322 is guided to the second area A2 through the first light guide plate 323, while being blocked from guiding to the first area A1. Accordingly, the light generated from the second light source package 322 is emitted through the top surface in the second area A2. The light generated from the fourth light source package 324 can be guided through the first light guide plate 323 and emitted through the top surface in the third area A3 as the central area. Accordingly, as shown in part (b) of FIG. 13, the viewing angle for the front and sides of the display device 3 can be entirely open in the second and third areas A2 and A3.

The light generated from the third light source package 331 can be guided through the second light guide plate 332 and emitted through the top surface of the second light guide plate 332. The emitted light can be controlled within a narrow viewing angle range by the light shielding pattern 342, passing through the light path control pattern 340. As a result, the viewing angle for the front of the display device 3 can be open while the viewing angle for the sides can be restricted in the first area A1.

As such, the third mode is a partial privacy mode (third privacy mode) where the display device 3 can operate such that the privacy mode is implemented only in the first area A1 while the third area A3 and the second area A2 can be operated in a wide viewing angle mode or sharing mode.

Figure 14:
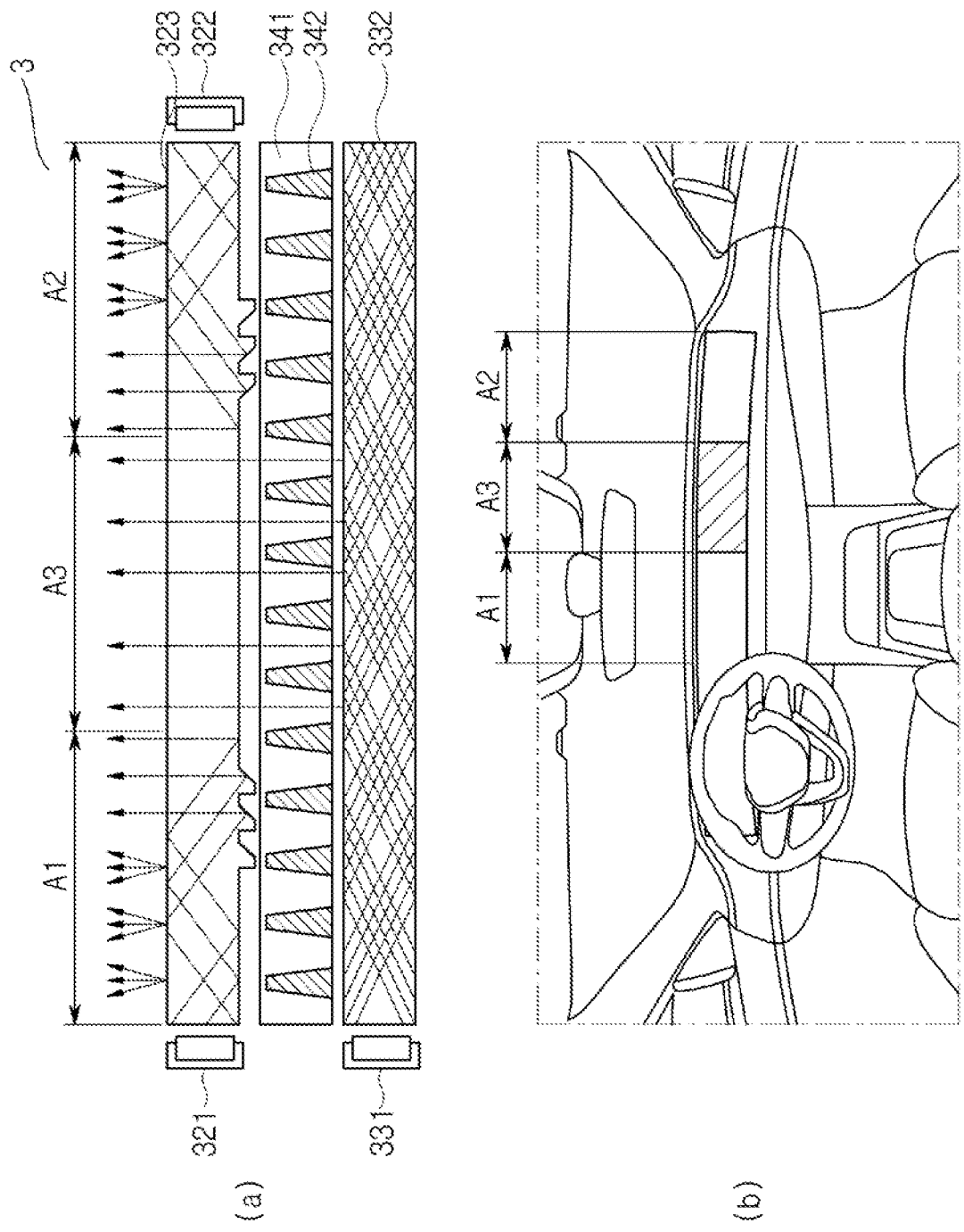

With reference to part (a) of FIG. 14, when the display device 3 operates in a fourth mode, the first and second light source packages 321 and 322 of the first backlight unit 320 and the third light source package 331 of the second backlight unit 120 are turned on. The fourth light source package 324 of the first backlight unit 320 can be turned off.

The light generated from the first light source package 321 is guided to the first area A1 through the first light guide plate 323, while being blocked from guiding to the second area A2 by the first pattern 323*a*. Similarly, the light generated from the second light source package 322 is guided to the second area A2 through the first light guide plate 323, while being blocked from entering the first area A1 by the second pattern 323*b*.

As a result, the light generated from the first and second light source packages 321 and 322 is emitted through the top surface in both the first and second areas A1 and A2.

The light generated from the third light source package 331 can be guided through the second light guide plate 332 and emitted through the top surface of the second light guide plate 332. The emitted light can be controlled within a narrow angle range by the light shielding pattern 342, passing through the light path control pattern 340. Accordingly, as shown in part (b) of FIG. 14, the viewing angle for the front of the display device 3 can be open and the viewing angle for the sides can be limited in the third area A3.

As such, the fourth mode is a partial privacy mode (fourth privacy mode) where the display device 4 can operate such that the privacy mode is implemented only in the second area A3. For example, the third area A3 can provide a narrow viewing angle, while the first area A1 and the second area A2 can provide a wide viewing angle.

Figure 15:
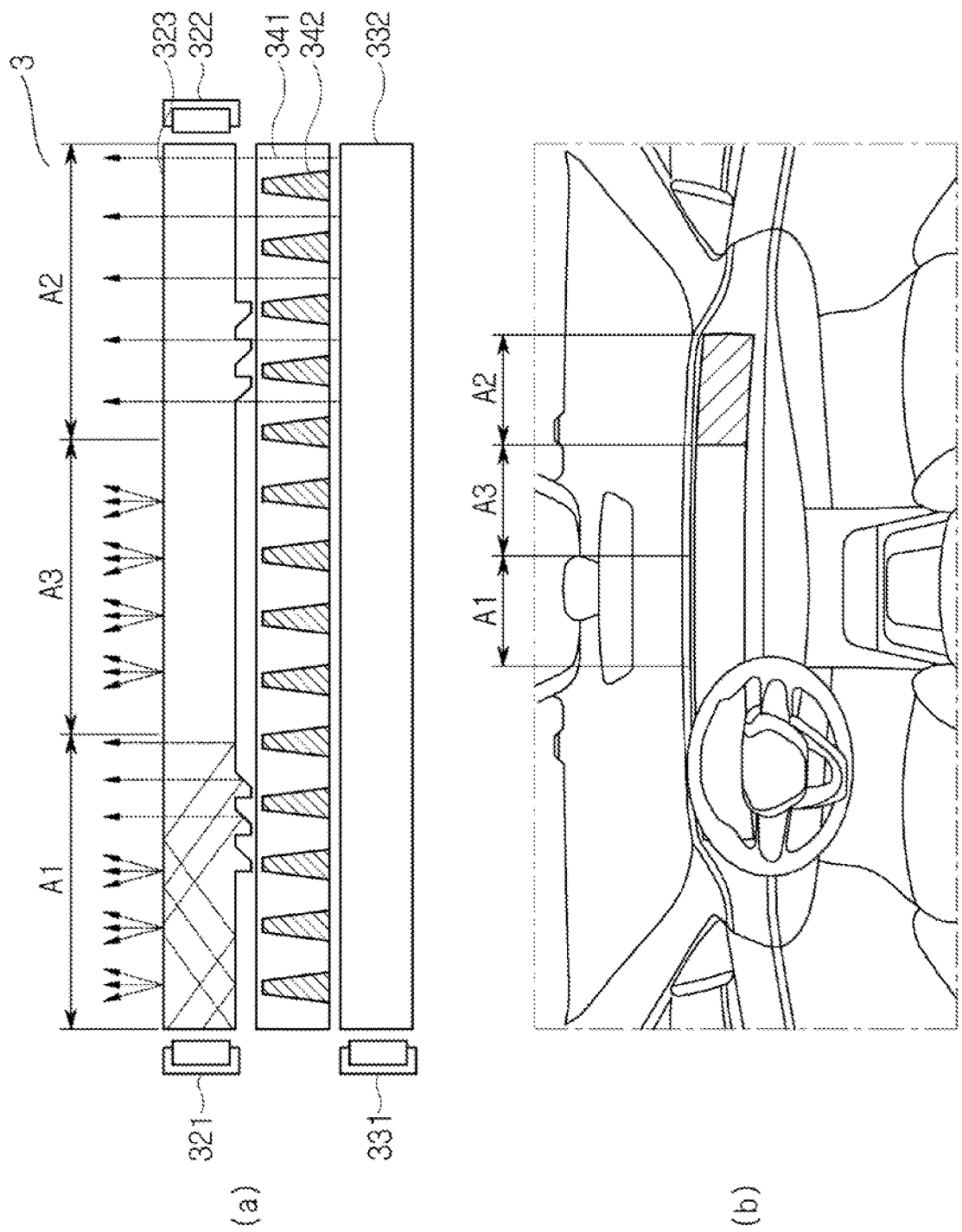

With reference to part (a) of FIG. 15, when the display device 3 operates in a fifth mode, the first and fourth light source packages 321 and 324 of the first backlight unit 320 and the third light source package 331 of the second backlight unit 120 are turned on. The second light source package 322 of the first backlight unit 320 can be turned off.

The light generated from the first light source package 321 is guided to the first area A1 through the first light guide plate 323, while being blocked from entering the second area A2. Accordingly, the light emitted from the first light source package 321 is emitted through the top surface in the second area A1. The light generated from the fourth light source package 324 can be guided through the first light guide plate 323 and emitted through the top surface in the third area A3 as the central area. Therefore, the viewing angle can be entirely open to the front and sides of the display device 1 in the first and third areas A1 and A3.

The light generated from the third light source package 331 can be guided through the second light guide plate 332 and emitted through the top surface of the second light guide plate 332. The emitted light can be controlled within a narrow viewing angle range by the light shielding pattern 342, passing through the light path control pattern 340. Accordingly, as shown in part (b) of FIG. 15, the viewing angle for the front of the display device 3 can be open and the viewing angle for the sides can be limited in the second area A2.

As such, the fifth mode is a partial privacy mode (fifth privacy mode) where the display device 3 can operate such that the privacy mode is implemented only in the second area A2. For example, the first area A1 and the third area A3 can provide a wide viewing angle, while the second area A2 provides a narrow viewing angle.

Figure 16:
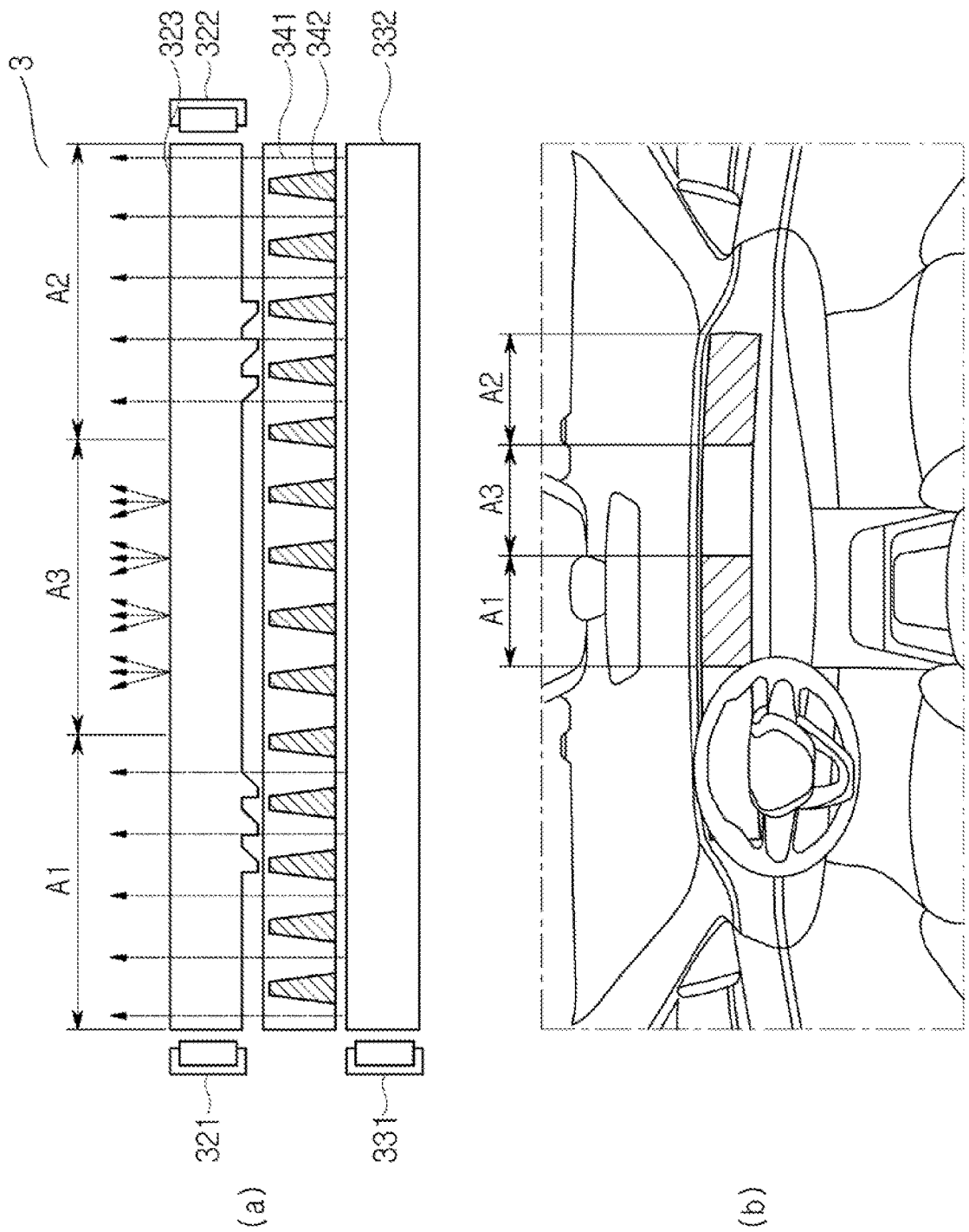

With reference to part (a) of FIG. 16, when the display device 3 operates in a sixth mode, the fourth light source package 324 of the first backlight unit 320 and the third light source package 331 of the second backlight unit 120 are turned on. The first and second light source packages 321 and 322 of the first backlight unit 320 can be turned off.

The light generated from the fourth light source package 324 can be guided through the first light guide plate 323 and emitted through the top surface in the third area A3 as the central area. Therefore, the viewing angle can be entirely open to the front and sides of the display device 3 in the third area A3.

The light generated from the third light source package 331 can be guided through the second light guide plate 332 and emitted through the top surface of the second light guide plate 332. The emitted light can be controlled within a narrow viewing angle range by the light shielding pattern 342, passing through the light path control pattern 340. Accordingly, as shown in part (b) of FIG. 16, the viewing angle for the front of the display device 3 can be open and the viewing angle for the sides can be limited in the first and second areas A1 and A2.

As such, the sixth mode is a partial privacy mode (sixth privacy mode) where the display device 3 can operate such that the privacy mode is implemented only in the first and second areas A1 and A2. For example, the first area A1 and the second area A2 can provide a narrow viewing angle, while the third area A3 provides a wide viewing angle.

Also, according to another embodiment, the display device 3 can provide a high luminance mode in which the first light source package 121, the second light source package 122, the third light source package 131 and the fourth light source package 324 are all turned on at the same time (e.g., this can be helpful when the ambient light is bright, such as on sunny days or during emergency situations, etc.).

Figure 17:
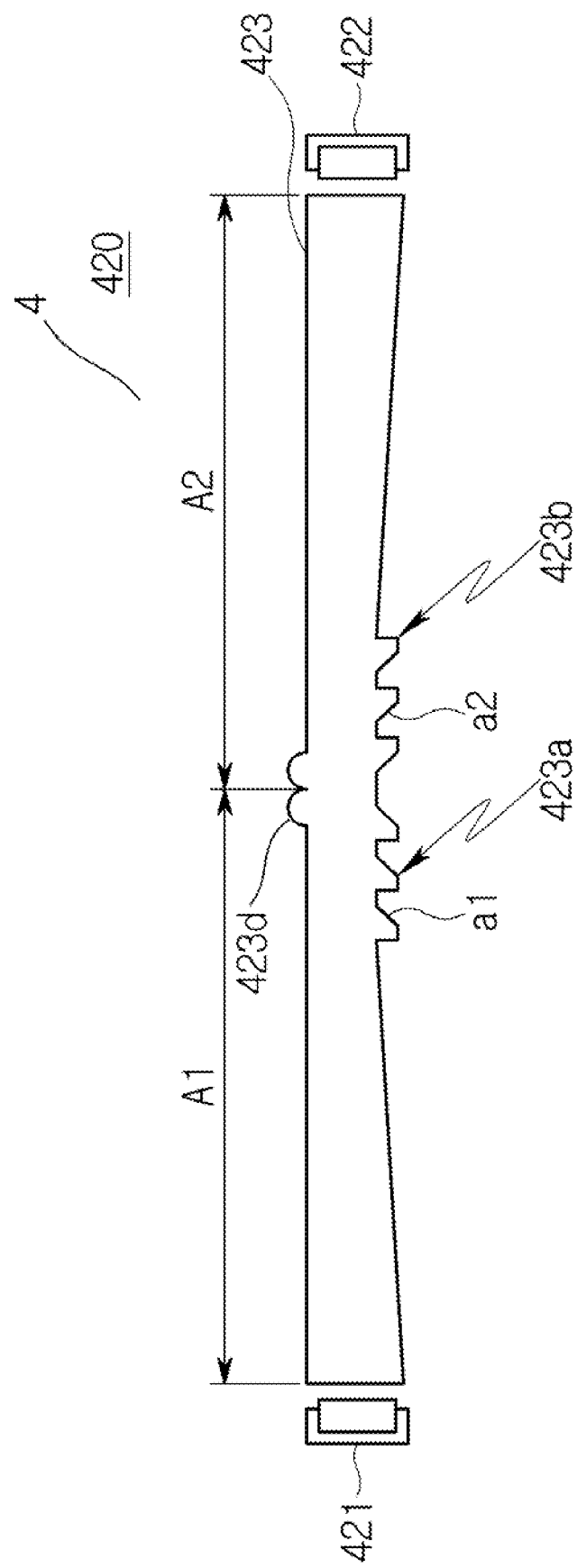
FIG. 17 is a cross-sectional view schematically illustrating a structure of a first backlight unit according to another embodiment of the present disclosure.

FIG. 17 is a cross-sectional view schematically illustrating a structure of a first backlight unit according to another embodiment. The display device 4 according to the embodiment of FIG. 17 is identical with that according to the embodiment of FIG. 1 except for the structure of the first light guide plate 433. Therefore, detailed descriptions of components that are identical or overlapping with those in the embodiment of FIG. 1 are omitted.

With reference to FIG. 17, the first backlight unit 420 can include a first light source package 421, a second light source package 422, and a first light guide plate 423.

The first light guide plate 423 is interposed between the first and second light source packages 421 and 422. The first light guide plate 423 is disposed between the first and second light source packages 421 and 422, facing the first and second light source package 421 and 422, to guide the light incident from the first and second light source package 421 and 422 and emit the light through the top surface.

The first light guide plate 423 can include first patterns 423a and second patterns 423b that protrude from the bottom surface thereof. The first patterns 423a and second patterns 423b can be formed on the bottom surface of the first light guide plate 423 in a relief manner by a molding or printing method.

In an embodiment, the first patterns 423a and second patterns 423b can be formed over the entire bottom surface of the first light guide plate 423 or in at least one region. For example, the first patterns 423a can be formed in a first area A1 adjacent to the first light source package 421 on the first light guide plate 423. The second patterns 423b can be formed in the second area A2 adjacent to the second light source package 422 on the first light guide plate 423. Here, the first patterns 423a and second patterns 423b can be arranged adjacent to each other at the boundary between the first and second areas A1 and A2.

The first pattern 423a and second pattern 423b can be identical or similar to each other in shape. For example, the first patterns 423a and second patterns 423b can have a mirrored shape or symmetrical arrangement based on the boundary between the first and second areas A1 and A2.

The first pattern 423a can face the first light source package 421 and include at least one first inclined surface a1 having a predetermined inclination angle to the bottom surface of the first light guide plate 423. Similarly, the second patterns 423b can include at least one second inclined surface a2 facing the second light source package 422 and having a predetermined inclination angle to the bottom surface of the first light guide plate 423. In an embodiment, the inclination angle is about 30° to 50° and preferably 40°, but is not limited thereto.

In this embodiment, the cross-section of the first patterns 423a and second patterns 423b can be an asymmetric trapezoid with the aforementioned inclined surfaces a1 and a2 as the vertical sides. However, the profile is not limited to this embodiment, and the cross-sections of the first patterns 423a and second patterns 423b can have various shapes such as asymmetric triangles or polygons with the aforementioned inclined surfaces a1 and a2 as the sides.

The first patterns 423a and second patterns 423b are spaced apart at similar intervals and can have a long bar shape extending parallel to the sides adjacent to the light source packages 421 and 422. However, without being limited to this embodiment, the first patterns 423a and second patterns 423b can have long or short bar or dot shapes that are arranged regularly or irregularly spaced apart or dispersed.

In the embodiment of FIG. 17, the first light guide plate 423 can further include fourth patterns 423d that protrude from the top surface of the first light guide plate 423. The third patterns 423d can be formed on the top surface of the first light guide plate 423 in a relief manner by a molding or printing method.

The fourth patterns 423d can be formed over the entire top surface of the first light guide plate 423 or in at least one area. For example, the fourth patterns 423d can be formed in the central area of the top surface of the first light guide plate 423.

The fourth patterns 423d can be lenses having a domed shape or hemispherical shape, whose cross section is semicircular. The fourth patterns 423d can collect and disperse light emitted from the first light guide plate 423 towards the front and sides in the central area. As a result, it is possible to improve an issue of a discontinuous image being perceived by a viewer at the boundary between the first and second areas A1 and A2, which is caused by the first and second patterns 423a and 423b blocking of light guides.

Meanwhile, in the embodiment of FIG. 17, the first light guide plate 423 is formed to have a variable thickness. For example, the first light guide plate 423 can be formed to have the thickest thickness at the edges adjacent to the first and second light source packages 421 and 422, and decreasing gradually towards the central area (e.g., reverse tapered shapes). Such variation in thickness can make it possible to better block the light emitted from the first light source package 421 from being guided toward the second area A2 and the light emitted from the second light source package 422 from being guided toward the first area A1.

A backlight unit and a display device including the same according to embodiments is capable of efficiently controlling a viewing angle by forming asymmetric patterns on a bottom surface a light guide plate of an upper one of multiple backlight units constituting the display device.

A backlight unit and a display device including the same according to embodiments is capable of improving the cut-off efficiency that restricts the driver's view, while allowing the driver to view an image with enhanced brightness when necessary, and selectively providing different viewing modes for different areas of the display screen which can selectively provide different viewing angles.

A backlight unit and a display device including the same according to embodiments is capable of controlling the range of viewing angles and cut-off efficiency by adjusting the size, height, and side angle of patterns with asymmetric shapes.

Those skilled in the art to which the present invention pertains will understand that the present invention can be embodied in other specific forms without changing its technical spirit or essential features. Therefore, it should be understood that the embodiments described above are exemplary and not limited in all respects. The scope of the invention should be determined by the appended claims rather than the detailed description above, and all changes or modifications derived from the meaning and scope of the claims and equivalent concepts thereof should be construed as being included in the scope of the present invention.

What is claimed is:

1. A display device comprising:
   a display panel configured to display an image;
   a first backlight unit disposed under the display panel, and configured to emit light to the display panel;
   a second backlight unit disposed under the first backlight unit, and configured to emit light to the display panel; and
   a light path control pattern disposed between the first backlight unit and the second backlight unit, the light path control pattern including a light shielding pattern configured to control the light emitted from the second backlight unit to be emitted towards the display panel with a narrow viewing angle,
   wherein the first backlight unit includes:
   a first light source package configured to output light;
   a second light source package configured to output light, the second light source package facing toward the first light source package; and
   a first light guide plate disposed between the first light source package and the second light source package, the first light guide plate including patterns that protrude from a bottom surface of the first light guide plate,
   wherein each of the patterns includes at least one inclined surface that faces toward the first light source package or the second light source package.

2. The display device of claim 1, further comprising:
   a third light source package configured to output light; and
   a second light guide plate disposed on one side of the third light source package.

3. The display device of claim 2, wherein the patterns include:
   first patterns disposed in a first area adjacent to the first light source package, the first patterns including first inclined surfaces facing toward the first light source package; and
   second patterns disposed in a second area adjacent to the second light source package, the second patterns including second inclined surfaces facing toward the second light source package.

4. The display device of claim 3, wherein the first inclined surfaces of the first patterns are configured to refract the light output from the first light source package to be emitted through a top surface of the light guide plate in the first area,
   wherein the second inclined surfaces of the second patterns are configured to refract the light output from the second light source package to be emitted through the top surface of the light guide plate in the second area, and
   wherein the second light guide plate is configured to direct the light output from the third light source package through a top surface of the second light guide plate, and the light path control pattern is configured to control the light output through the top surface of the second light guide plate to be emitted towards the display panel with a narrow viewing angle in the first and second areas.

5. The display device of claim 3, further comprising a third area formed between the first area and the second area, wherein the first backlight unit further includes a fourth light source package disposed on one side of the third area, the fourth light source package being configured to output light.

6. The display device of claim 5, wherein the first light guide plate is configured to direct light output from the fourth light source package to be emitted through the top surface of the first light guide plate in the third area.

7. The display device of claim 3, wherein the patterns further include third patterns disposed in a third area between the first area and the second area, the third patterns including third inclined surfaces facing toward the first backlight unit or the second backlight unit.

8. The display device of claim 7, wherein each of the third inclined surfaces has an inclination angle that is smaller than inclination angles of the first inclined surfaces and the second inclined surfaces.

9. A display device comprising:
- a display panel configured to display images, the display panel including a first area and a second area;
- a first backlight unit including a first light source package and a second light source package;
- a second backlight unit including a third light source package;
- a light path control pattern disposed between the first backlight unit and the second backlight unit, the light path control pattern being configured to direct light output from the second backlight unit toward the first backlight unit with a narrow viewing angle; and
- a controller configured to:
- in response to turning both of the first light source package and the second light source package on and turning the third light source package off, display one or more images in the first area and the second area with a wide viewing angle based on a share viewing mode, and
- in response to turning both of the first light source package and the second light source package off and turning the third light source package on, display one or more images in the first area and the second area with a narrow viewing angle based on a privacy viewing mode,
- wherein the wide viewing angle has a wider viewing angle than the narrow viewing angle.

10. The display device of claim 9, wherein the controller is further configured to:
- in response to turning one of the first light source package and the second light source package on and turning the third light source package on, display an image in the first area with a narrow viewing angle and display an image in the second area with a wide viewing angle based on a mixed viewing mode.

11. The display device of claim 9, wherein the first backlight unit includes a first light guide plate,
wherein the first light source package and the second light source package are disposed on opposite sides of the first light guide plate, wherein the first light guide plate includes patterns having inclined surfaces disposed between the first light source package and the second light source package, and wherein a cross-section of each of the patterns includes a trapezoidal shape.

* * * * *